(12) United States Patent
Tucker et al.

(10) Patent No.: US 12,400,270 B2
(45) Date of Patent: Aug. 26, 2025

(54) SYSTEMS AND METHODS FOR MODELING TELEMATICS DATA

(71) Applicant: State Farm Mutual Automobile Insurance Company, Bloomington, IL (US)

(72) Inventors: Benjamin J. Tucker, Bloomington, IL (US); Jody A. Thoele, Bloomington, IL (US); Scott T. Christensen, Salem, OR (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 0 days.

(21) Appl. No.: 17/713,135

(22) Filed: Apr. 4, 2022

(65) Prior Publication Data

US 2022/0318921 A1 Oct. 6, 2022

Related U.S. Application Data

(60) Provisional application No. 63/234,990, filed on Aug. 19, 2021, provisional application No. 63/170,843, filed on Apr. 5, 2021.

(51) Int. Cl.
*G06Q 30/0202* (2023.01)
*G06Q 40/08* (2012.01)

(52) U.S. Cl.
CPC ......... *G06Q 40/08* (2013.01); *G06Q 30/0202* (2013.01)

(58) Field of Classification Search
CPC ........................... G06Q 40/08; G06Q 30/0202
USPC ............................................................. 705/4
See application file for complete search history.

(56) References Cited

U.S. PATENT DOCUMENTS

| 9,311,271 | B2 | 4/2016 | Wright |
| 9,633,487 | B2 | 4/2017 | Wright |
| 9,830,748 | B2 | 11/2017 | Rosenbaum |
| 9,990,782 | B2 | 6/2018 | Rosenbaum |

(Continued)

FOREIGN PATENT DOCUMENTS

| EP | 3239686 A1 | 11/2017 |
| EP | 3578433 B1 | 8/2020 |

(Continued)

OTHER PUBLICATIONS

U.S. Appl. No. 15/631,988 entitled "System and Method for Coordinating Transportation Payments".

*Primary Examiner* — Robert R Niquette
(74) *Attorney, Agent, or Firm* — Armstrong Teasdale LLP

(57) ABSTRACT

Provided herein is a computing system that includes a processor in communication with a memory. The processor is configured to (1) receive a plurality of data records associated with a plurality of users that include historical user data; (2) generate a model based upon the plurality of data records, wherein the model (i) predicts travel behavior of a user, and/or (ii) outputs an insurance policy and associated premium for the user based upon the predicted travel behavior; (3) retrieve current user data associated with the candidate user; (4) apply the model to (i) determine a user trial travel behavior, and/or (ii) output a trial insurance policy and associated premium for the candidate user; and/or (5) transmit a notification to the user computing device that includes a prompt for the user to register for the insurance policy.

16 Claims, 9 Drawing Sheets

(56) References Cited

U.S. PATENT DOCUMENTS

| | | |
|---|---|---|
| 10,192,369 B2 | 1/2019 | Wright |
| 10,198,879 B2 | 2/2019 | Wright |
| 10,269,190 B2 | 4/2019 | Rosenbaum |
| 10,467,824 B2 | 11/2019 | Rosenbaum |
| 11,227,452 B2 | 1/2022 | Rosenbaum |
| 11,407,410 B2 | 8/2022 | Rosenbaum |
| 11,524,707 B2 | 12/2022 | Rosenbaum |
| 11,594,083 B1 | 2/2023 | Rosenbaum |
| 2013/0317862 A1* | 11/2013 | Fernandes ................ G07C 5/00 705/4 |
| 2014/0149147 A1* | 5/2014 | Luciani ................ G06Q 40/08 705/4 |
| 2017/0099582 A1* | 4/2017 | Boesen ................ H04L 67/52 |
| 2017/0255966 A1* | 9/2017 | Khoury ................ B60W 40/00 |
| 2018/0060970 A1* | 3/2018 | Oduor ................ G06Q 40/08 |
| 2019/0102840 A1* | 4/2019 | Perl ................ G06N 3/08 |
| 2022/0092893 A1 | 3/2022 | Rosenbaum |
| 2022/0108247 A1* | 4/2022 | Haworth ................ G06Q 50/265 |
| 2022/0340148 A1 | 10/2022 | Rosenbaum |
| 2023/0060300 A1 | 3/2023 | Rosenbaum |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |

\* cited by examiner

| Policy Options and Pricing | | | |
|---|---|---|---|
| Physical Damage? | | N | Y |
| MPC Limits | $5000 | $3000 | $5000 | $3000 |
| BIPD Limits 25/50/15 | $108 | $102 | $156 | $150 |
| BIPD Limits 100/300/100 | $150 | $144 | $198 | $192 |

Figure 5A

| PMP Policy Options and Pricing (per 6 months) | | |
|---|---|---|
| Liability (BIPD, UBI, WBI) | | |
| Limits | 25/50/15 | 100/300/100 |
| Bodily Injury and Property Damage (BIPD) | $54 | $78 |
| Uninsured Bodily Injury (UBI) | $6 | $6 |
| Underinsured Bodily Injury (WBI) | $6 | $24 |
| Price of Total Liability Package | $66 | $108 |
| Medical Payments | | |
| Limits | $3,000 | $5,000 |
| Price of Coverage | $36 | $42 |
| Physical Damage (Comprehensive, Collision, ERS) | | |
| Price of Coverage | $48 | |

Figure 5B

SYSTEMS AND METHODS FOR MODELING TELEMATICS DATA

CROSS-REFERENCE TO RELATED APPLICATIONS

This application claims priority to U.S. Provisional Application No. 63/170,843 filed Apr. 5, 2021, entitled "Systems and Methods for Modeling Telematics Data," and U.S. Provisional Application No. 63/234,990, filed Aug. 19, 2021, entitled "Systems and Methods for Modeling Telematics Data," and further relates to co-pending patent Application Ser. No. 17/713,133, filed on the same day as this application and entitled "Systems and Methods for Modeling Telematics Data," the entire contents and disclosures of which are hereby incorporated herein by reference in their entirety.

FIELD OF THE DISCLOSURE

The present disclosure relates to modeling telematics data, and more particularly, to systems and methods for generating a model using historical user data to determine an insurance policy and associated premium for users based upon current user data (e.g., telematics sensor data, location data, third-party data, etc.) inputted into the model.

BACKGROUND

The landscape of vehicle insurance coverage has been changing with the increased popularity of alternative transportation options, such as, for example, ride sharing services, scooter and bike rental services, public transportation, and walking. Utilizing these alternative forms of transportation to commute from place to place is becoming increasingly common. Further, users may switch from one transportation mode to another mode during a single trip and/or throughout the week based upon cost, available modes of transportation, time of day, day of the week, and location. Additionally, individuals generally use mobile devices (e.g., smartphones, tablets) for a variety of purposes and often carry mobile devices while traveling. Individuals may utilize mobile devices to locate, schedule, request and/or pay for rides in real time with various transportation services.

At least some known insurance policies may not adequately provide insurance coverage for these different types of transportation options. Further, known systems and methods do not underwrite and customize insurance plans for these different types of transportation options based upon retrieved user data and data from similar users, which results in an inefficient underwriting process and insurance plans that do not accurately cover all modes of transportation for users. Conventional techniques may also be inconvenient, awkward, time consuming, and/or have additional drawbacks as well.

BRIEF SUMMARY

The present embodiments relate to systems and methods for generating a model to analyze user data (e.g., telematics data from telematics sensors, location data, etc.) and determine insurance policies and associated premiums for a user based upon the analyzed user data. The insurance policies may include personal mobility policies that may cover users who utilize various modes of transportation other than a personal vehicle that the user may own and/or lease. For example, personal mobility policies may cover modes of transportation that include vehicle rentals, public transportation (e.g., buses, trolleys, trams, metro, subway, airlines, coaches, ferry, and rapid rail), taxis, ride-sharing services, scooter rentals, bike rentals, etc.

In one aspect, a computer system including a processor in communication with at least one memory. The processor is programmed to (1) retrieve, from the at least one memory, a plurality of data records associated with a plurality of users, wherein the plurality of data records includes historical user data; (2) generate a model based upon the plurality of data records, wherein the model is configured to (i) predict travel behavior of a user, and (ii) output an insurance policy and associated premium for the user based upon the predicted travel behavior; (3) retrieve, from a user computing device of a candidate user, candidate user data including trial user data for a first interval of time comprising a trial period; (4) apply the model to the retrieved trial user data to (i) determine a user trial travel behavior, and (ii) output a trial insurance policy and associated premium for the candidate user; and (5) transmit a registration notification to the user computing device, wherein the registration notification includes a prompt for the candidate user to select, the selection of the prompt causes the user to be registered for the trial insurance policy. The computer system may be programmed to direct additional, less, or alternate functionality, including that discussed elsewhere herein.

In another aspect, a computer-implemented method implemented by a computing system including a processor (and/or associated transceiver) in communication with at least one memory may be provided. The method may include: (1) retrieving, from the at least one memory, a plurality of data records associated with a plurality of users, wherein the plurality of data records includes historical user data; (2) generating a model based upon the plurality of data records, wherein the model is configured to (i) predict travel behavior of a user, and (ii) output an insurance policy and associated premium for the user based upon the predicted travel behavior; (3) retrieving, from a user computing device of a candidate user, candidate user data including trial user data for a first interval of time comprising a trial period; (4) applying the model to the retrieved trial user data to (i) determine a user trial travel behavior, and (ii) output a trial insurance policy and associated premium for the candidate user; and (5) transmitting a registration notification to the user computing device, wherein the registration notification includes a prompt for the candidate user to select, the selection of the prompt causes the user to be registered for the trial insurance policy. The method may include additional, less, or alternate functionality, including that discussed elsewhere herein.

In yet another aspect, at least one non-transitory computer-readable storage media having computer-executable instructions embodied thereon may be provided. When executed by at least one processor (and/or associated transceiver) in communication with at least one memory device, the computer-executable instructions may cause the processor to: (1) retrieve, from the at least one memory, a plurality of data records associated with a plurality of users, wherein the plurality of data records includes historical user data; (2) generate a model based upon the plurality of data records, wherein the model is configured to (i) predict travel behavior of a user, and (ii) output an insurance policy and associated premium for the user based upon the predicted travel behavior; (3) retrieve, from a user computing device of a candidate user, candidate user data including trial user data for a first interval of time comprising a trial period; (4) apply the model to the retrieved trial user data to (i) determine a user trial travel behavior, and (ii) output a trial insurance policy and associated premium for the candidate user; and (5) transmit a registration notification to the user computing device, wherein the registration notification includes a prompt for the candidate user to select, the selection of the prompt causes the user to be registered for the trial insurance policy. The instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIGS. 5A and 5B illustrate exemplary underwriting and premium price charts output by the exemplary computer system shown in FIG. 1B.

Figure 1A:
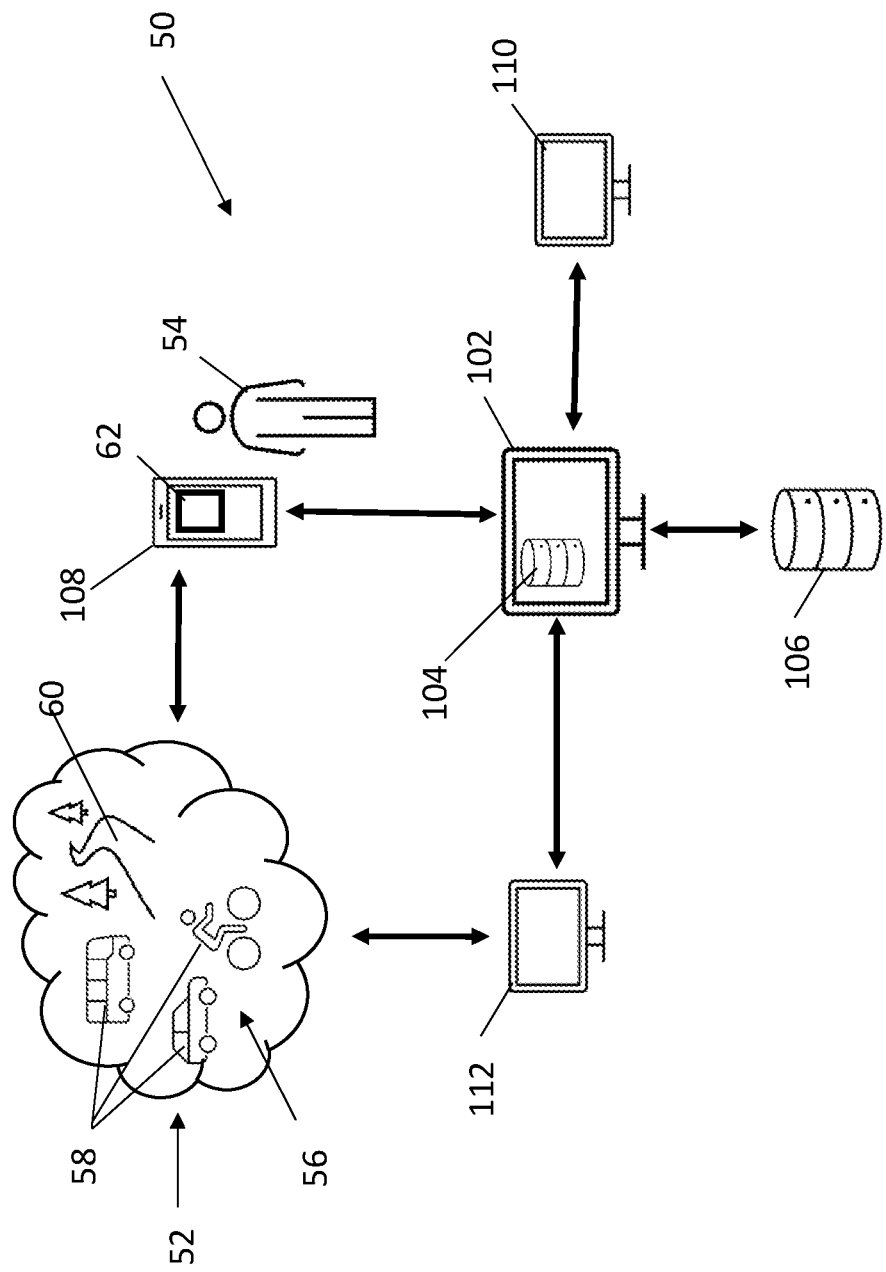
FIG. 1A is a schematic diagram illustrating an exemplary system for generating a model that analyzes user travel data to determine common modes of transportation in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for utilizing historical user data to build a model to analyze current user data, and then use the model to determine insurance policies and associated premiums for users based upon the current user data. In one of the exemplary embodiments, the historical user data includes telematics sensor data, location data, and third-party data. In one exemplary embodiment, the process may be performed by a modeling computing device (also referred to herein as a modeling server or a modeling computer system). In some embodiments, the modeling computing device may be associated with an insurance provider or another service provider that provides insurance coverage to users.

In at least some embodiments, the determined insurance policy may include a personal mobility policy (PMP) or personal mobility (PM) insurance that is based upon a user's usage of various forms of transportation. As more personal mobility options (e.g., modes of transportation) become available to individuals, users have more options to choose from when it comes to travel, and many users want insurance coverage even if the users do not own a personal vehicle. The insurance coverage may be needed to cover the user or another person in case of an accident suffered while using the mode of transportation. Personal mobility insurance may provide coverage when a user is a pedestrian, riding public transportation, a passenger of a ride-sharing service, a rider of a bike (e.g., that the user owns or rents), a rider of a scooter or electric scooter (e.g., that the user owns or rents), and/or a driver or passenger of a rental vehicle.

In the exemplary embodiment, the modeling computing device retrieves historical user data from a database in communication with the modeling computing device. The historical user data may include, for example, personal data (e.g., demographics data), historical telematics sensor data (e.g., generated by telematics sensors included within or in communication with user computing devices), historical location data (e.g., from a GPS sensor and/or other location sensors included within or in communication with user computing devices), historical insurance data (e.g., associated with insurance policies held by users and associated premiums of the insurance policies and any insurance claim data), and/or historical third-party data (e.g., transaction data of transactions between users and transportation services or providers, like ride sharing services and bike/scooter rental services).

The modeling computing device may generate, using the historical user data, a model that first determines modes of transportation most frequently used by users based upon historical user data, and then determines, based upon the most frequent modes of transportation, insurance policies and associated premiums for users using those modes of transportation. In other words, the historical user data is used to build the model that may then be applied to current input data to generate an output. More specifically, current user data for a candidate user may be inputted into the model, and the model may be trained to output a customized insurance policy and associated premium for the candidate user based upon the predicted most frequently used modes of transportation for the candidate user.

Using the candidate user's data (e.g., geolocation and/or telematics data) and the model generated based upon other users' historical data, the insurance policy and associated premium offered to the candidate user are more precise and relevant to the particular user. Moreover, the insurance policy and associated premium can be offered based upon minimal data (e.g., a user's opt-in and user data automatically retrieved from a user computing device such as through an app or application operating on the user computing device and configured to capture the user data, third-party server, database storing user data, etc.), which may accelerate and/or otherwise make an underwriting or policy-offer process more efficient. That is, instead of an insurance provider having to investigate each user requesting to be covered by an insurance policy individually, as in conventional systems, an insurance policy and associated premium may be generated by the modeling computing device based upon minimal user input.

The modeling computing device may analyze, using the generated model, the historical user data to cluster users based upon residence location (e.g., by cities, neighborhood, street ranges, etc.) and determine the modes of transportation most frequently utilized by users of each cluster. For example, the modeling computing device may determine, based upon the model, that users in the Midtown neighborhood of New York City almost exclusively walk and ride the subway for transportation, while users in more residential neighborhoods in Brooklyn may use bikes, buses, the subway, and occasionally a rental vehicle for transportation.

The modeling computing device and the generated model may analyze risk (e.g., quantify a likelihood of injury or property damage suffered—collectively referred to as "damage" or "losses" based upon insurance claim data and medical data resulting from damages and injuries incurred during use of the various modes of transportation) associated with each mode of transportation frequented by the users of each cluster, and use the quantified likelihood of damage in the generation of insurance premiums associated with insurance policies. For example, the modeling computing device may determine that riding public transportation or walking is relatively low risk for users (e.g., there is a low likelihood that users are involved in accidents or get injured on public transportation or that when injured the level of injury is minor), being a passenger in a ride sharing vehicle is relatively medium risk, and renting a vehicle or riding a bike or a scooter is relatively high risk (e.g., high likelihood of an accident or severe injury when injured). Accordingly, the model may be trained to determine that users in the Midtown neighborhood may need insurance policies that mainly cover the users walking and riding public transportation, while the users in the residential Brooklyn neighborhoods may need insurance policies that cover bike riding, public transportation riding, and vehicle rental. Since the modes of transportation for the users in the Midtown neighborhood are relatively low risk (e.g., low likelihood of accruing and/or low likelihood of severe injury or damage) as compared to other transportation users, the premiums associated with the insurance policies of these users may be low as compared to premiums for other transportation users, while the premiums associated with the insurance policies of the users in residential Brooklyn may be higher since the risk associated with the modes of transportation for the users in residential Brooklyn is higher.

Further, the modeling computing device and the generated model may analyze risk associated with a travel behavior of the users of each cluster and use the quantified likelihood of damage in the generation of insurance premiums associated with insurance policies. The travel behavior of a user is associated with the travel habits of the user for a plurality of trips. For example, the travel behavior may include one or more modes of transportation, distance traveled, amount of time traveled, time of day of travel, traffic conditions, weather conditions, and/or routes traveled. The modeling computing device may determine that travel behavior including riding a public transportation during the early morning and late evenings, under light traffic conditions, has a lower risk compared with travel behavior including using the same public transportation under rush-hour traffic conditions. The modeling computing device may determine, using the model, that high risk travel behavior includes frequent travel during times of day with heavy traffic conditions while using a high risk transportation mode, while lower risk travel behavior (e.g., safer travel behavior, may include infrequent travel during times of day with light traffic conditions while using low risk transportation modes). The premiums associated with the insurance policies of users having high risk travel behavior may be higher as compared to premiums for users having lower risk travel behavior. For example, the modeling computing device may determine, using the model, that users in the age bracket of 70-80 years need insurance policies that mainly cover infrequent travel including walking and riding public transportation during mid-day hours having light traffic conditions, while only traveling short distances (e.g., to a nearby grocery store). In another example, the modeling computing device may determine, using the model, that users in the age bracket of 20-30 years need insurance policies that cover frequent travel using bike riding, public transportation riding, and vehicle rental, while traveling longer distances (e.g., to and from work and/or school) during peak traffic conditions. Since the travel behavior for the users in the higher age bracket are relatively low risk as compared to the lower age bracket, the premiums associated with the insurance policies of the users in the higher age bracket may be lower as compared to premiums for the younger users. Likewise, the premiums associated with the insurance policies of the younger users may be higher since the risk associated with their travel behavior is higher.

Once the historical user data has been analyzed and the modeling computing device has generated and trained the model, current user data associated with a candidate user may be inputted into the model to determine an insurance policy and associated premium for the candidate user based upon the current user data. The current user data, like the historical user data, may include, for example, telematics sensor data, location data, insurance data, and/or third-party data. The modeling computing device, using the model, may determine which cluster the candidate user fits into based upon the current user data and generate an insurance policy and associated premium based upon the cluster of the user. Using the above examples, if the modeling computing device determines, through analysis of the current user data, that the candidate user resides in a residential neighborhood of Brooklyn, the modeling computing device may generate an insurance policy and associated premium accounting for the candidate user's predicted most frequent modes of transportation being bike riding, public transportation riding, and vehicle rental. Additionally, the modeling computing device may use the model to determine a travel behavior of the candidate user and associated premiums accounting for the candidate users' predicted travel behavior. Using the above examples, if the modeling computing device determines, through analysis of the current user data, that the candidate user is in the age bracket of 80-90 years, the modeling computing device may generate an insurance policy and associated premium accounting for the candidate user's predicted travel behavior of in frequent travel using low risk travel modes.

It should be understood herein that while the insurance policy and associated premium may be generated based upon the most common modes of transportation or the predicted travel behavior for the candidate user, the insurance policy may cover any modes of transportation and any travel behavior that the candidate user utilizes. For example, even if the candidate user rarely uses ride sharing and therefore the likelihood of damage resulting from ride sharing is not a major factor in the determination of the premium associated with the candidate user's insurance policy, the candidate user would still be covered by the insurance policy if the user uses a ride sharing service, or any other form of personal mobility transportation.

Further, the modeling computing device may adjust the generated insurance policy and associated premium based upon further analysis of the current user data. For example, a new user may adjust their travel behavior to appear safer during an enrollment process, in order to obtain a lower insurance premium. For example, if the modeling computing device determines that the candidate user does not utilize the modes of transportation that are most commonly used by the users of the cluster into which the candidate user fits based upon the residence location of the candidate user, the modeling computing device may determine a different cluster that better fits the travel behavior of the candidate user and/or customize the insurance policy and associated premium of the candidate user independent of the clusters of the modeling computing device. That is, if analysis of the candidate user data shows that the candidate user resides in Brooklyn but almost exclusively uses ride sharing services for transportation, the modeling computing device may identify a cluster that utilizes ride sharing services most frequently and generate an insurance policy for the candidate user based upon that cluster and/or generate an insurance policy that covers frequent ride sharing services and has a medium premium for the medium risk associated with being a passenger of a ride sharing service. In some cases, the candidate user data may be captured during a trial period where the candidate user data is captured by a user computing device for a trial period of time and then analyzed by the modeling computing device. The modeling computing device may identify the cluster that the user should be placed in based upon the data captured during the trial period. For example, the user computing device may have an app stored thereon that may be configured to gather telematics data of the user while the user is traveling, and then communicate the captured telematics data back to the modeling computer device for input into the model. This gathering and transmission of data may be done with no input from the user, other than loading the app on the user phone. Thus, with no other input from the user, the telematics data of a user may be collected and entered into the model such that an output of a type of insurance policy with premium calculated can be electronically sent to the user for display on the user device (e.g., using the app). The user only then needs to click or otherwise accept the policy, and coverage is issued.

In some cases, the modeling computing device may collect users' data for different time intervals in order to determine changes in the users' travel behavior. The modeling computing device may apply the model to candidate user data collected during a validation time period to determine a user validation travel behavior. The modeling computing device may execute the model and use the candidate user data collected during a validation time period as inputs into the model, where the executed model will output the user validation travel behavior. The modeling computing device may compare the user trial travel behavior with the user validation travel behavior to complete a validation process. In other words, the modeling computing device compares the user trial travel behavior with the user validation travel behavior to confirm that the users travel behavior has not changed. The trial period of time includes a first-time interval and the validation period includes a second time interval generally occurring after the first-time interval. Accordingly, the modeling computing device is able to monitor the travel behavior of the user and make adjustments to the user's insurance plan and premiums based on changes in the users travel behavior. In some embodiments, the validation may occur using the app stored on the user computing device.

The modeling computing device may transmit a notification to a user computing device of the candidate user that includes the insurance policy and associated premium generated for the candidate user by the modeling computing device. In some embodiments, the notification may include a pre-populated registration form that easily allows (e.g., with "one-click" or voice command, or some other acknowledgement) the candidate user to register for the insurance policy and immediately begin receiving coverage after registration. In some embodiments, the modeling computing device may generate the insurance policy and associated premium for the candidate user in response to an insurance inquiry from the candidate user. In other embodiments, the modeling computing device may generate the insurance policy and associated premium automatically (e.g., without user input) as part of an advertising or marketing campaign for an insurance company.

In the exemplary embodiment, the modeling computing device may further analyze the current user data of the candidate user to determine one or more optimized or preferred routes for the user based upon modes of transportation available to the user associated with the lowest risk or lowest likelihood of incurring damages. For example, if a typical commute of the candidate user is relatively high-risk (e.g., high likelihood of suffering damages or losses as a result of the transportation commute) because the typical commute includes walking to a bike rental stop and renting a bike to complete the commute, the modeling computing device may generate an alternate route for the user utilizing user data showing lower risk routes of similar users and/or analyzing public transportation schedules and availability (e.g., retrieved from third-party transportation services computing devices).

That is, the modeling computing device may identify, from the historical user data, a user with a similar commute (e.g., similar start and end times, similar length, similar start and end locations, etc.) that takes a bus instead of renting a bike, and the modeling computing device may transmit a notification to the candidate user (e.g., via the app stored on the user mobile device or by SMS or other messaging service) that walking to a bus stop is a preferable route to walking to a bike rental to rent a bike. The modeling computing device may further determine, by analyzing the current user data of the candidate user, whether the candidate user is following the preferred route. If it is determined that the candidate user is following the preferred route, the modeling computing device may transmit a reward to the candidate user and/or lower a premium for the insurance policy of the candidate user based upon the now lower risk commute of the candidate user. In another embodiment, the modeling computing device may be in further communication with a third-party device that has access to travel routes and/or modes of transportation in various geographic areas, and may access this data when determining a preferred route for a candidate user.

As used herein, insurance "coverage" includes any insurance policy that reimburses and/or pays for physical and material damages resulting from a collision or accident involving a user covered by the insurance policy.

"App," as used herein, may refer generally to a software application installed and downloaded on a user computing device and executed to provide an interactive graphical user interface at the user computing device. An app associated with the computer system, as described herein, may be understood to be maintained by the computer system and/or one or more components thereof.

"Telematics data," as used herein, may refer generally to data associated with monitoring a moving computing device. Telematics data incorporates location, movement (e.g., speed, direction, acceleration, etc.), and condition (e.g., "on", "off", in-motion, etc.) data based upon a plurality of sensors on-board the computing device and/or connected to the computing device. Accordingly, where the computing device is associated with a vehicle, the telematics data may be associated with monitoring the vehicle. Where the computing device is a personal mobile computing device, such as a smart phone, the telematics data may be associated with monitoring the personal mobile computing device. In at least some cases, the personal mobile computing device may be used to capture vehicle telematics data, where the personal mobile computing device is present in/on a vehicle during motion/use of the vehicle. In some cases, the personal mobile computer device includes an accelerometer that provides telematics data. In other cases, the personal mobile computer device includes a global positioning system (GPS) that provides location and movement information. In still further embodiments, the personal mobile computer device connects to a vehicle that the user is traveling in, such as via Bluetooth or Near Field Communication or by connecting to a Wi-Fi connection provided by the vehicle. In these further embodiments, the personal mobile computer device may be able to receive telematics data from the vehicle and/or to identify the vehicle that the user is traveling, whether it is a bicycle, scooter, ride-share vehicle, or bus, for example. In some cases, this telematics data is collected by the user mobile computing device using an app stored thereon. In other embodiments, the app may be configured to receive or retrieve transaction data associated with the user such as transactions made for purchasing travel services. For example, if a user purchases a ride sharing service or a rental bike, the transaction data (e.g., confirming that a ride share or bike rental was purchased on a certain date and time, and at a certain location, etc.) may be shared with the model computer device as telematics data.

"Sensor data," as used herein, may refer generally to data captured by sensors that is not necessarily associated with the movement of a computing device. For example, sensor data for a vehicle may include data that captures movement of occupants of the vehicle, which may not affect the motion of the vehicle. In some cases, telematics data may include sensor data, where data is sent in packets that include data from all sensors associated with a computing device (e.g., both motion and non-motion sensor data).

"Personal mobility (PM) insurance" or "personal mobility policy (PMP)," as used herein, may refer generally to insurance policies based upon a user's usage of various forms of transportation. As increasingly more personal mobility options (e.g., modes of transportation) become available, users have more options to choose from when it comes to travel. Personal mobility insurance may provide coverage when a user is a pedestrian, a passenger of a ride-sharing service, and/or a driver of a rental vehicle, a semi-autonomous vehicle, and/or an autonomous vehicle. In other cases, personal mobility insurance may provide a user with coverage when the user rides a bike or an electric scooter.

Additionally, the present embodiments may relate to micro-mobility or micro mobility trends. For instance, the PMP or other insurance policies may cover micro-mobility forms of transformation and/or provide micro-mobility coverage on demand. The present embodiments may provide micro-mobility coverage or micro-mobility insurance for short distance travel—such as the first mile of a trip (such as to reach or travel to a public transportation or a ride share pick-up point), or the last mile of the trip (such as to reach or travel to a final destination, such as via e-scooter or bike).

Retrieving User Data

In the exemplary embodiment, the modeling computing device may retrieve user data (e.g., both historical user data and candidate user data) from a database in communication with the modeling computing device. The database may be stored in a memory of a user computing device in communication with the modeling computing device and/or the modeling computing device may store the historical user data in a database. The user data may include, for example, personal data (e.g., demographics data), telematics sensor data (e.g., generated by telematics sensors included within or in communication with user computing devices), location data (e.g., from a GPS sensor and/or other location sensors included within on in communication with user computing devices), insurance data (e.g., associated with insurance policies held by users and associated premiums of the insurance policies and any insurance claim data), and/or third-party data (e.g., transaction data of transactions between users and transportation services or providers, like ride sharing services and bike/scooter rental services).

The modeling computing device may retrieve the user data from the user computing device (e.g., a mobile phone device). For example, the user computing device may have an application ("app") installed on the user computing device (such as a mobile device) that generates telematics data. The app may generate the telematics data based upon data received from sensors onboard the user computing device (e.g., an accelerometer, a global positioning system (GPS), or a gyroscope). The telematics data may include, for example, a position (e.g., geographic coordinates), a speed, acceleration and deceleration, and/or an orientation of the user computing device.

The modeling computing device may also retrieve additional data collected by, and/or obtained by, the app installed on the user computing device. For example, the app may collect transaction data associated with payments initiated with a third-party transportation service. For example, the user may purchase a rental transportation service (e.g., a rental car). The transaction data may include a payment receipt, a type of rented transportation (e.g., make and model of vehicle, year of vehicle, etc.), and a rental time period. The transaction data may include additional and/or alternative data associated with the transaction, e.g., purchased rental car protection coverage.

The app may support a user interface displayed on the user computing device. The user interface may have interactive capabilities enabling the app to prompt the user to answer one or more inquiry messages presented to the user via the user interface. In some cases, the app may prompt the user to indicate a mode of transportation currently in use (e.g., during a real-time travel event). For example, the modeling computing device may use telematics data, retrieved from the user computing device, and the model to determine that the user is moving at various speeds between zero miles per hour and thirty-five miles per hour. The modeling computing device may further use the model to predict one or more likely modes of transportation based on the retrieved telematics data. The modeling computing device may transmit an instruction message to the app, installed on the user computing device, causing the app to prompt the user to provide information regarding the mode of transportation currently in use. In some examples, the app may present a plurality of likely modes of transportation predicted by the modeling computing device. In the instant example, described above, the user is traveling at various speeds between zero miles per hour and thirty-five miles per hour and the modeling computing device may determine potential modes of transportation includes a bus, a car, and/or a train. In other words, the modeling computing device predicted that it is unlikely that the user is traveling using a bicycle, based on the telematics data. The modeling computing device may then transmit an instruction message to the app, such that the app displays a selectable list on the user interface prompting the user to select the current mode of transportation. In some other cases, the user may utilize the app to update a mode of transportation, without being prompted by the app. The app may also determine that the user has connected to the vehicle, such as via Wi-Fi or Bluetooth, and therefore able to provide information about the vehicle itself. The information about the vehicle may include identification information and/or actual telematics information. In one example, the vehicle is a train and the user computer device has connected to the Wi-Fi connection provided by the train to its passengers. In this example, the app may identify the train based on the information provided via the Wi-Fi connection. In some further embodiments, the train through the Wi-Fi connection provides travel information, such as current speed, location, distance to next stop, and/or other travel information. The app may retrieve this information to model the user's current trip.

The user computing device and/or the app installed on the user computing device, may transmit the user data to the modeling computing device. In some embodiments, the user computing device and/or the app may transmit user data continuously to the modeling computing device. Alternatively, the user computing device may collect user data continuously and periodically transmit the user data to the modeling computing device in bulk. In certain embodiments, the modeling computing device may additionally or alternatively receive user data generated by the user computing device from third parties. The modeling computing device may store the retrieved user data in a database.

The modeling computing device may receive data from third-party sources. For example, using the app, the user may provide login information to various user accounts associated with transportation (e.g., rideshare accounts, bike share accounts, public transportation accounts, or travel accounts). The modeling computing device may use the login information to access third-party computing devices associated with the various accounts. For example, the user may take a trip on a rideshare using a rideshare platform or a bicycle using a bicycle share platform. Data corresponding to the trip may be generated by the rideshare platform or bicycle share platform and stored on a third-party computing device associated with the rideshare organization. The modeling computing device may retrieve the data from the third-party computing device and store the data in the database. The modeling computer device may also receive information from a public transportation system, where the user uses their account to ride on the public transportation system, such as using their card or account to get a ride on a bus or subway. The modeling computer device may receive the information from the public transportation computer system that provides account and ride information using an API to retrieve such data.

Based upon the retrieved user data, the modeling computing device may determine the modes of transportation that the users utilize. That is, the modeling computing device may determine, using the telematics data and location data of the users, the travel behavior of the user and what modes of transportation the users use daily, weekly, monthly etc. For example, the telematics data and location data of a user (e.g., provided by the sensors located on the user mobile device) may show that the user moves at a speed of three miles per hour to a bus stop, then moves at various speeds between zero miles per hour and thirty-five miles per hour, stops at a bus stop, and then moves at a speed of three miles per hour to a building twice a day, every weekday.

Accordingly, the modeling computing device may determine that a commute of the user is walking to a bus stop, riding a bus, and then walking from the bus stop to work and home. Additionally, the telematics data and location data of a user may show that the user moves from their home and to work and back at various speeds between zero miles per hour and thirty-five miles per hour twice a day, every weekday. Further, third-party data for the user may show that the user has two transactions with a ride sharing service every weekday. Accordingly, the modeling computing device may determine that a commute of the user is using a ride sharing service to and from work.

Historical user data may be retrieved by the modeling computing device when the users opt-in to allow for data to be shared with the modeling computing device. For example, the users may allow an insurance provider associated with the modeling computing device to retrieve user data when the users register for an insurance policy with the insurance provider.

Historical data may include one or more of a historic trip report associated with a historic trip. The historic trip reports may be generated by the user, provided by third-parties (ride-share and public transportation systems), provided from purchased ticket information, and recreated based on historical GPS and accelerometer information from the user computer device. Historic trip reports include a mode of transportation, a distance traveled, an amount of time traveled, time of day of trip, weather conditions, and traffic conditions present at the time of the trip. Additionally, historic trip reports may include prior accident data and/or successful trip data. Accident data may include the date and time of the accident, location of the accident, weather conditions present at the time of the accident, personal injury data and/or property damage data. Accident data may also include a damage amount associated with the cost of the accident. For example, accident data may include a cost associated with medical expenses and/or a cost associated with the repair and/or replacement of property damaged during the accident. In some cases, historic trip reports may include a number of successful trips and a number of trips that resulted in or included an accident.

Candidate user data may be retrieved by the modeling computing device when the candidate user submits an insurance inquiry to receive insurance from an insurance provider associated with the modeling computing device. That is, the candidate user may opt-in for the modeling computing device to retrieve user data when the candidate user submits the insurance inquiry. Additionally, or alternatively, the candidate user data may be retrieved from databases in communication with the modeling computing device. For example, the candidate user may opt-in for third parties to share data with the modeling computing device when the candidate user utilizes the third-party services without specifically opting-in with the modeling computing device.

Building a Travel Model Based Upon User Data and Determining Travel Behavior and Most Commonly Used Modes of Transportation Upon retrieving the historical user data for a plurality of users, the modeling computing device may generate a model that predicts the most common modes of transportation used by users based upon the user data of the users. The modeling computing device may analyze, using the generated model, the historical user data to cluster users based upon residence location (e.g., by cities, neighborhood, street ranges, etc.) and determine the modes of transportation most frequently utilized by users of each cluster. The modeling computing device may utilize machine learning and/or artificial intelligence techniques to analyze the data. For example, the modeling computing device may utilize supervised, semi-supervised, and/or unsupervised machine learning techniques to analyze the historical user data.

Additionally, and/or alternatively, upon retrieving the historical user data, the modeling computing device may generate a model that predicts travel behaviors performed by users based upon the user data. In addition to historical user data from the plurality of users, the modeling computer device may also receive contextual data. The contextual data may include, but is not limited to, street maps, public transportation schedules, rules of travel for various forms of travel, and any other information to allow the system to determine how different users may have traveled. The modeling computing device may analyze, using the generated model, the historical user data to cluster users based upon user data, such as a demographic data (residence location, e.g., by cities, neighborhood, street ranges, and/or age, occupation, education, etc.), and determine the travel behavior frequently performed by users of each cluster. The modeling computing device may utilize machine learning and/or artificial intelligence techniques to analyze the historical data in view of the contextual data. For example, the modeling computing device may utilize supervised, semi-supervised, and/or unsupervised machine learning techniques to analyze the historical user data and the contextual data to determine the travel behavior of a user is associated with a plurality of trips taken by the user. For example, the travel behavior of a user may include one or more modes of transportation, time of travel, time of day of travel, an amount of time spent on each mode of transportation, and distance traveled on each mode of transportation.

The modeling computing device may build and train the model using a learning data set. The learning data set includes historical user data for a plurality of users and for a plurality of modes of transportation, for a plurality of trips. Learning data also may include accident reports associated with the one or more modes of transportation. Accident reports include data associated with a traffic related accident, such as location and time of accident, weather conditions, traffic conditions, and costs associated with personal injury and property damage. The learning data set may also include data associated with successful trips performed using the one or more modes of transportation. The modeling computing device may determine and/or calculate one or more parameters that will be included in the learning data. For example, the modeling computing device may determine for each mode of transportation, a ratio of the number of successful trips to the number of trips resulting in an accident. The modeling computing device may include this ratio in the learning data set. The learning data set may also include historic user data of a historic user, such as demographic data (e.g., residence location, age, occupation, etc.) and an associated one or more modes of transportation utilized by the historic user. Learning data, utilized by the modeling computing device includes any data suitable to build and train the model.

In supervised learning, the modeling computing device may use labeled historical user data to determine what modes of transportation are most frequently used by users based upon user data associated with the users. For example, the modeling computing device may use labeled historical data to determine what modes of transportation are most commonly used by users in different age ranges (e.g., 18-24, 25-40, 41-60, 61-85, etc.) who live in San Francisco. In unsupervised learning, the modeling computing device may use unlabeled historical user data to cluster users based upon the most common modes of transportation used by the users. Once the clusters are generated by the modeling computing device, the modeling computing device may determine the attributes of the users that are similar between the clusters. For example, the modeling computing device may determine that a cluster of users who utilize public transportation and walking the most may live in city centers and may be under the age of 35, while a cluster of users who utilize ride sharing and vehicle rental the most may live in suburban areas and may be over the age of 35. Semi-supervised learning may be substantially similar to supervised learning, and the modeling computing device may use labeled user data to adjust the clusters of users and make sure that the clusters of users are accurate by using the labeled user data as training data.

Once the model is generated by the modeling computing device, the modeling computing device may store the model in a database that is in communication with the modeling computing device. The modeling computing device may further train and adjust the model as the modeling computing device receives more user data (e.g., historical user data and candidate user data).

In some embodiments, user travel information for the plurality of users is stored without including sensitive personal information, also known as personally identifiable information or PII, in order to ensure the privacy of individuals associated with the stored data. Personally identifiable information may include any information capable of identifying an individual. For privacy and security reasons, personally identifiable information may be withheld from the cardholder profiles. In some examples where privacy and security can otherwise be ensured, or where individuals consent, personally identifiable information may be retained in the user information. In such examples, personally identifiable information may be needed to create enhanced travel assessments. In situations in which the systems discussed herein collect personal information about individuals including travelers, or may make use of such personal information, the individuals may be provided with an opportunity to control whether such information is collected or to control whether and/or how such information is used. In addition, certain data may be processed in one or more ways before it is stored or used, so that personally identifiable information is removed. For example, an individual's identity may be processed so that no personally identifiable information can be determined for the individual, or an individual's geographic location may be generalized where location data is obtained (such as to a city, ZIP code, or state level), so that a particular location of an individual cannot be determined. Thus, the individual may have control over how information is collected about the individual and used by systems including the user computing device.

Generating a Policy and Associated Premium Using the Model

Once the historical user data has been analyzed and the modeling computing device has generated the model, current user data associated with a candidate user may be input into the model to predict (i) the modes of transportation most commonly used by the candidate user, and (ii) an insurance policy and associated premium for the candidate user based upon predicted modes of transportation. The current user data, like the historical user data, may include, for example, personal data, telematics sensor data, location data, insurance data, and/or third-party data. Additionally or alternatively, the current user data may only include a limited amount of data that is inputted into the model to generate an appropriate and material output. For example, the current user data may only include an age of the user and a geographic location of where the user lives, and this may be a sufficient amount of input data to generate an accurate output from the model including the types of modes of transportation this user will likely use and an insurance policy including premium amount for a PMP insurance policy for the user. The modeling computing device, using the model, may determine which cluster the candidate user fits into based upon the current user data to predict the modes of transportation most frequently utilized by the candidate user, and generate an insurance policy and associated premium based upon the cluster of the user.

Additionally, and/or alternatively, once the historical user data has been analyzed and the modeling computing device has generated the model, current user data associated with a candidate user may be input into the model to predict (i) travel behavior of the candidate user, and (ii) an insurance policy and associated premium for the candidate user based upon predicted user travel behavior. The current user data, like the historical user data, may include, for example, personal data, telematics sensor data, location data, insurance data, and/or third-party data. The modeling computing device, using the model, may determine which cluster the candidate user fits into based upon the current user data to predict the travel behavior performed by the candidate user, and generate an insurance policy and associated premium based upon the cluster of the user.

The user travel behavior is associated with the travel habits of a user for a plurality of trips taken by the user over a period of time. The travel behavior may include one or more modes of transportation, travel commute times, distance traveled, and additional and/or alternative data associated with traveling habits of the user. The modeling computing device may determine that the user travel behavior includes a user routine travel, a user periodic travel, and/or a user current travel. The user travel routine may be associated with one or more trips that a user performs frequently (e.g., weekly and/or daily). For example, a user travel routine may include one or more trips that the user performs, routinely, to get to and from a user's residence and an occupation location and/or a school. The user periodic travel may be associated with a periodic travel performed by the user on a semi-regular basis (e.g., a reoccurring monthly and/or bi-weekly trip). For example, the user periodic travel may include weekend trips to a vacation home that the user travels to during the summer months. In another example, the user periodic travel may include a reoccurring monthly business trip. Additionally, and/or alternatively, the modeling computing device may utilize the determined travel behavior to predict a current trip being performed by the user in real-time. In other words, the modeling computing device may use the determined travel behavior to predict a remainder of a trip. For example, based on user data received from the user computing device during an initial period of time, e.g., at the start of a trip, the modeling computing device may predict the rest of the trip.

In some cases, the modeling computing device may determine the travel behavior by collecting user data for a training period of time. For example, during the training period, the modeling computing device may retrieve, from the user computing device, user data captured by the user computing device. The modeling computing device may utilize the user data collected during the training period and the travel model to determine a trial travel behavior of the user.

After the training period, the modeling computing device may continue to retrieve data, periodically or continuously, from the user computer device to track and/or monitor the travel behavior of the user. For example, after the training period, the modeling computing device may retrieve data from the user computing device for a validation period of time. During the validation period, the modeling computing device may generate a validation travel behavior that reflects the traveling habits of the user during the validation period. The modeling computing device may then compare the validation travel behavior to the trial travel behavior, in order to complete a validation process. In some cases, during the validation period, the modeling computing device may compare user data collected during the validation period with the user data collected during the training period. Further, the modeling computing device may adjust the generated insurance policy and associated premium based upon the determined travel behavior of the user.

If the modeling computing device determines that the validation travel behavior is substantially similar to the trial travel behavior, the validation process is successful. If the modeling computing device determines that the validation travel behavior is not the same as the trial travel behavior, the validation process fails. Upon validation failure, the modeling computing device may determine an updated travel behavior using the model and the user data collected during at least one of the training period, the validation period, and/or a combination of the user data collected during both the training period and the validation period. In some cases, the validation travel behavior may be substantially different from the trial travel behavior, and in such instances, the modeling computing device determines an updated travel behavior using the model and the user data collected during the validation period. This validation process may be subsequently repeated any number of times in order to maintain or update the most current travel behavior of the user.

Using the above examples, if the modeling computing device determines, through analysis of the current user data, that the candidate user resides in a residential neighborhood of Brooklyn, the modeling computing device may predict that the candidate user most commonly uses bike riding, public transportation, and vehicle rental and therefore generate an insurance policy for the user with a relatively high premium rate (e.g., due to a relatively high likelihood of the user being involved in a damage-producing incident using bike riding and vehicle rental). Further, the modeling computing device may adjust the generated insurance policy and associated premium based upon further analysis of the current user data. For example, if the modeling computing device determines that the candidate user does not utilize the modes of transportation that are most commonly used by the users of the cluster into which the candidate user fits based upon the residence location of the candidate user, the modeling computing device may determine a different cluster that better fits the modes of transportation of the candidate user and/or customize the insurance policy and associated premium of the candidate user independent of the clusters of the modeling computing device. That is, if analysis of the candidate user data shows that the candidate user resides in Brooklyn but almost exclusively uses ride sharing services for transportation, the modeling computing device may identify a cluster that utilizes ride sharing services most frequently and generate an insurance policy for the candidate user based upon that cluster and/or generate an insurance policy that covers frequent ride sharing services and has a medium premium for the medium risk associated with being a passenger of a ride sharing service.

Candidate User Registration for the Generated Insurance Policy and User Application The modeling computing device may transmit a notification to a user computing device of the candidate user including the generated insurance policy and associated premium for the candidate user by the modeling computing device. In some embodiments, the notification may include a pre-populated registration form that easily allows (e.g., with "one-click") the candidate user to register (e.g., accept or agree to) for the insurance policy and immediately begin receiving coverage after registration. In some embodiments, the modeling computing device may generate the insurance policy and associated premium for the candidate user in response to an insurance inquiry from the candidate user. In other embodiments, the modeling computing device may generate the insurance policy and associated premium automatically (e.g., without user input) as part of an advertising or marketing campaign for an insurance company. In some cases, the modeling computing device is able to predict the modes of transportation of a user, predict the likelihood of that user incurring losses while using those modes of transportation, estimate insurance premiums based upon the loss prediction, generate an insurance policy covering that user for those modes of transportation, transmit the insurance policy to the user's computing device, and register the user for the policy all in a matter of minutes, and in some cases, in a matter of seconds, which could not be done using conventional practices. This can be done because of the limited amount of input data needed for the model. Because the model may only require an age and a home location as inputs into the model to generate all of the outputs discussed above, a PMP insurance policy can be generated and electronically provided to a potential customer with little to no input from the user.

The notification may include the modes of transportation that the modeling computing device predicts the candidate user most often utilizes. For example, a notification message may be sent to the user for display on the user device such that the notification message causes an interface to be displayed that includes a report showing the predicted modes of transportation for the user and the amount of time (e.g., either in minutes or in miles) spent using each mode of transportation. If the candidate user notices discrepancies between the modes of transportation the candidate user most commonly uses and the predicted modes of transportation by the modeling computing device along with the amounts of time predicted, the candidate user may input, through the user computing device, that the candidate user does not accept the insurance policy and associated premium and would like a new insurance policy to be generated based on new inputs from the user including actual modes of transportation used by the user and corresponding amounts of time spent on those modes. The modeling computing device may then generate an insurance policy based upon the candidate user input until the candidate user accepts the insurance policy and associated premium.

In some examples, the notification may include the user travel behavior that the model predicts that the candidate may perform. The travel behavior includes one or more modes transportation, amount of time of travel, time of day of travel, an amount of time spent on each mode of transportation, distance traveled on each mode of transportation. A report would be displayed showing this travel behavior. Additionally, the travel behavior may include one or more user preferred travel routines and user periodic travel. If the candidate user notices discrepancies between the travel behavior of the candidate and the travel behavior predicted by the modeling computing device, the candidate user may input, through the user computing device, that the candidate user does not accept the insurance policy and associated premium and would like a new insurance policy to be generated. The modeling computing device may then generate an insurance policy based upon the candidate user input until the candidate user accepts the insurance policy and associated premium.

Once the candidate user accepts the insurance policy and associated premium, the modeling computing device may continue receiving and analyzing user data from the candidate user. The modeling computing device may monitor the user data to determine whether the insurance policy and associated premium for the candidate user needs to be adjusted in a subsequent insurance billing cycle. For example, if the current user data for the candidate user shows that the candidate user utilizes modes of transportation in a different risk level more frequently than the insurance policy accounted for, the modeling computing device may adjust the insurance policy and associated premium for the candidate user in the next insurance billing cycle. In other words, after accepting the insurance policy, the system may store rules in memory that represent the terms and conditions of the insurance policy, gather new user data describing the travel habits of the user, and then automatically compare the travel habits of the user to the rules stored in memory to determine whether the user is in compliance with the terms and conditions of the insurance policy. For example, if one of the rules is a maximum number of times the user may use a scooter for travel in a month, then the system will gather scooter travel information for the user for a given month and compare it to the maximum threshold value to determine if the user is in compliance with the policy. If not in compliance, then the system may issue a new, updated policy for the user which would be electronically sent to the user for acceptance.

Additionally, the modeling computing device may monitor the user data of the candidate user to determine whether the candidate user is taking preferred routes generated by the modeling computing device to minimize the risk associated with the modes of transportation used by the candidate user. The modeling computing device may receive user data, such as telematics data from the user computer device, trip data from third-party systems, and telematics and/or identification data from vehicles that the candidate user travels in. If the modeling computing device determines that the candidate user is utilizing the preferred routes, the modeling computing device may transmit a reimbursement and/or a reward to the candidate user. For example, the modeling computing device may provide a credit to the candidate user toward a subsequent insurance policy payment, a direct deposit to an account of the candidate user, a gift card or prepaid card to be used toward a transaction with a merchant, etc.

In some embodiments, the modeling computing device may support an application, or an app, on the user computing device of the candidate user. The app may display (i) current metrics to the candidate user (e.g., a percentage of time the candidate user utilized each mode of transportation), and/or (ii) preferred routes generated by the modeling computing device for the candidate user, provide the terms and conditions of the insurance policy of the candidate user, provide a form for insurance claims if the candidate user is involved in an incident involving personal or material damage, allow the user to opt-in or opt-out of data sharing, etc.

Exemplary technical effects of the systems and methods described herein may include, for example: (a) receiving and processing telematics data and other data associated with users; (b) building a model to generate customized insurance policies and premiums for users based upon the received and processed telematics data and other data; (c) providing users with flexible personal mobility policies that cover many different modes of transportation; (d) generating insurance policies and associated premiums with minimal input from users (e.g., user computing devices of users transmit user data that is processed and then the insurance policy is transmitted to users without requiring user input); (e) providing a "one-click" insurance policy registration that auto-populates an insurance policy registration form for users, wherein the user is able to request a quote on an insurance policy with minimal input and the insurance policy is generated for the user and the user is register with the policy in a matter of seconds; (f) allowing insurance companies to target specific users based upon the determined insurance needs of the users; (g) utilizing machine learning and/or artificial intelligence techniques to generate and adjust the model wherein the model may be used to predict a user's likely mode(s) of transportation and/or travel behavior and the likelihood of experiencing an accident (e.g., property damage and physical injury as a result of the accident) using those mode(s) of transportation and/or travel behavior as opposed to undergoing a lengthy underwriting process that is typically used when providing insurance coverage; (h) generating preferred routes for users based upon received user data; (i) providing a tool that allows insurance providers to quickly and efficiently identify users eligible for personal mobility policies; (j) providing rewards and/or reimbursements to users for following the preferred routes and thereby minimizing risks associated with the routes taken for the users; (k) generating and displaying on a user device a user interface that includes a travel report showing each predicted mode of transportation along with an amount of time or distance associated with each mode of transportation; and/or (1) generating and displaying on a user device a user interface that includes an actual travel report showing each actual mode of transportation along with an amount of time or distance associated with each mode of transportation in combination with the predicted modes of transportation so a user can easily see how their actual travels differ from the predicted travels and if any changes to an existing insurance policy is needed.

Exemplary System

FIG. 1A is a schematic diagram illustrating an example system 50 in accordance with an exemplary embodiment of the present disclosure. In the exemplary embodiment, system 50 may be used for generating a model to analyze user data 52 and determine insurance policies and associated premiums for a user 54 based upon the user data 52. In the exemplary embodiment, system 50 may include a modeling computing device 102 and a database server 104. Modeling computing device 102 may be in communication with one or more databases 106 (or other memory devices), user computing devices 108, client devices 110, and/or third-party computing devices 112. A client computing device 110 and a third-party computing device 112 may be communicatively coupled with modeling computing device 102. A database server 104 may be communicatively coupled to database 106 that stores data. Modeling computing device 102 may be in communication with a plurality of user computing devices 108, client devices 110, and third-party computing devices 112 to generate a model to analyze user data and determine insurance policies and associated premiums for users based upon user data 52. Modeling computing device 102 generates the model based on historical user data associated with a plurality of users.

In the exemplary embodiment, user computing devices 108 may be computers that include a web browser or a software application, which enables user computing devices 108 to access remote computer devices, such as modeling computing device 102, using the Internet or other network. More specifically, user computing devices 108 may be communicatively coupled to modeling computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. User computing devices 108 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, user computing devices 108 may include telematics sensors (e.g., gyroscopes, accelerometers, and GPS) and may transmit telematics data (e.g., location, speed, and other relevant data related to movement of users) to modeling computing device 102. In some embodiments, an application ("app") 62 installed on the user computing device (such as a mobile device) generates telematics data. The app 62 may generate the telematics data based upon data received from sensors onboard user computing device 108 (e.g., an accelerometer, a global positioning system (GPS), or a gyroscope).

The model may be trained to predict a travel behavior 56 of an individual user 54 based on user data 52 collected by app 62. For example, model computing device 102 may be in communication with app 62, such that modeling computing device 102 retrieves user data 52 from user computing device 108. Modeling computing device 102 may retrieve user data 56 periodically and/or continuously. During a trial period of time, commencing after user 54 enrolls with system 50, modeling computing device 102 may retrieve user data 56 to determine a trial travel behavior of user 54. Specifically, modeling computing device 102 uses the model to predict the trial travel behavior of user 54 using user data 52 collected during the trial period. Subsequently, during a validation period of time, modeling computing device 102 may retrieve user data 56 to determine a validation travel behavior of user 54. Specifically, modeling computing device 102 uses the model to predict the validation travel behavior of user 54 using user data 52 collected during the validation period. During a validation process, modeling computing device 102 compares the trial travel behavior to the validation travel behavior. If the validation fails, modeling computing device 102 may determine an updated travel behavior using the model and user data 52 collected during at least one of the validation period, trial period, and/or a combination thereof.

Determined travel behavior 56 is associated with the travel habits of user 54 for a plurality of trips performed by user 54 over a period of time. For example, travel behavior 56 may include one or more modes of transportation 58 frequently or commonly used by user 54. Travel behavior 56 may include one or more travel routes 60. Alternatively, and/or additionally, travel behavior 56 may include travel times, time of day of travel, and distance traveled. The model may be trained to determine a user routine travel and a user periodic travel. The user travel routine may be associated with a typical and/or frequent traveling routine performed by user 54. For example, the user travel routine may be associated with trips that a user performs weekly and/or on a daily basis. The user periodic travel may be associated with a periodic and/or reoccurring travel performed by the user on a semi-regular basis (e.g., monthly or bi-weekly).

Exemplary Computer System

Figure 1B:
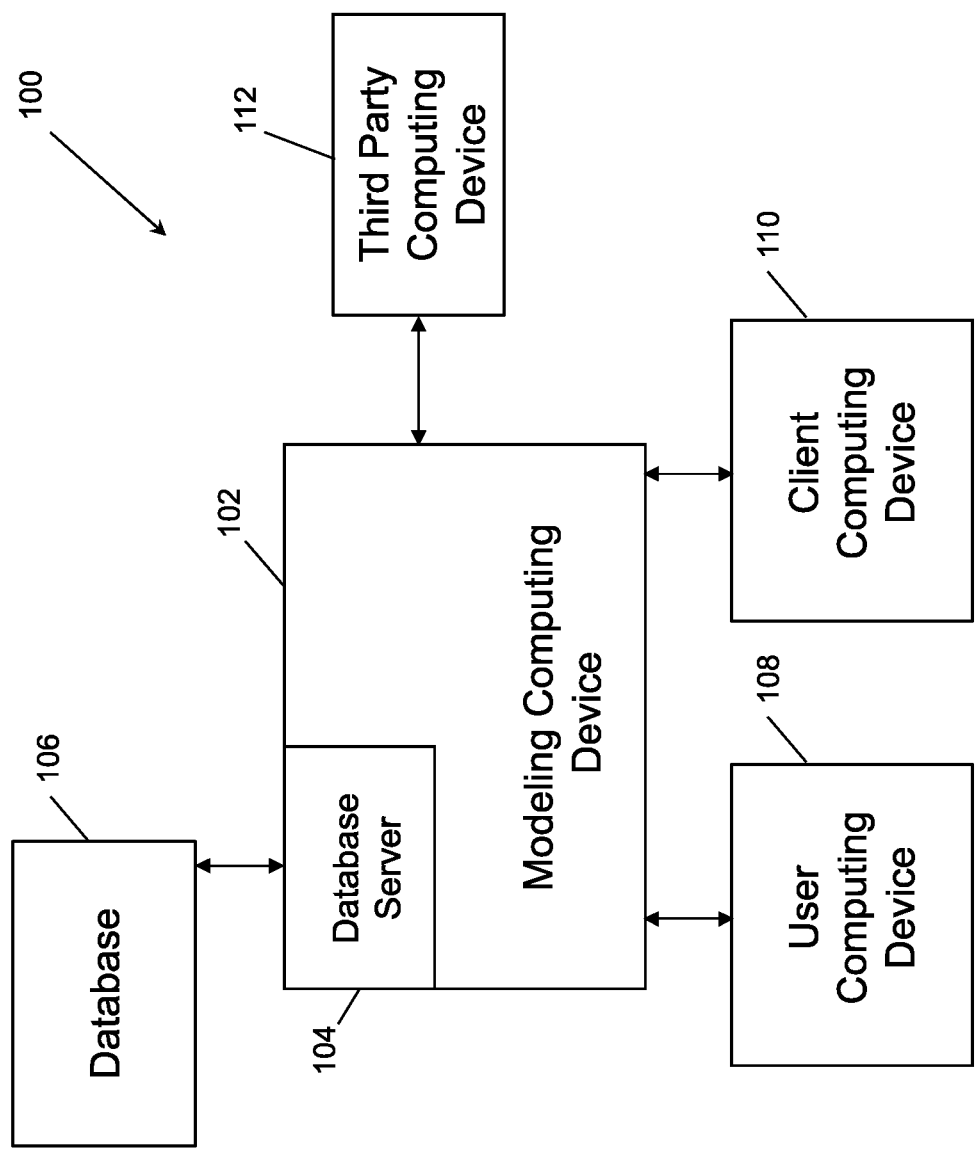
FIG. 1B illustrates a diagram of an exemplary computer system that is included in the system shown in FIG. 1A.

FIG. 1B depicts a simplified block diagram of an exemplary computer system 100 that is part of system 50 shown in FIG. 1A. In the exemplary embodiment, computer system 100 may be used for generating a model to analyze user data and determine insurance policies and associated premiums for users based upon the user data. In the exemplary embodiment, system 100 may include modeling computing device 102 and database server 104. Modeling computing device 102 may be in communication with one or more databases 106 (or other memory devices), user computing devices 108, client devices 110, and/or third-party computing devices 112.

Client computing device 110 may be communicatively coupled with modeling computing device 102. In some embodiments, client computing device 110 may be associated with, or is part of a computer network associated with an insurance provider, or in communication with the insurance provider's computer network (not shown). In other embodiments, client computing device 110 may be associated with another company or party and is merely in communication with the insurance provider's computer network. That is, client computing device 110 may be associated with an insurance provider of the user.

More specifically, client computing device 110 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client computing device 110 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Third-party computing device 112 may be communicatively coupled with modeling computing device 102. In some embodiments, third-party computing device 112 may be associated with, or is part of a computer network associated with a ride sharing provider, public transportation systems, an e-scooter rental provider, and/or a bike rental provider, or in communication with the ride sharing provider's, the public transportation computer systems, the e-scooter rental provider's, and/or the bike rental provider's computer network (not shown). In other embodiments, third-party computing device 112 may be associated with another company or party and is merely in communication with the ride sharing provider's, the public transportation computer systems, the e-scooter rental provider's, and/or the bike rental provider's computer network. That is, third-party computing device 112 may be associated with a ride sharing provider, the public transportation system, an e-scooter rental provider, and/or a bike rental provider that provides respective services to a user. More specifically, third-party computing device 112 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Third-party computing device 112 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Database server 104 may be communicatively coupled to database 106 that stores data. In one embodiment, database 106 may include user data associated with users, location data associated with the users, telematics data of the users, sensor data of the users, insurance data of the users, etc. In the exemplary embodiment, database 106 may be stored remotely from modeling computing device 102. In some embodiments, database 106 may be decentralized. In the exemplary embodiment, a user may access database 106 and/or modeling computing device via user computing device 108.

Modeling computing device 102 may be in communication with a plurality of user computing devices 108, client devices 110, and third-party computing devices 112 to generate a model to analyze user data and determine insurance policies and associated premiums for users based upon the user data. In some embodiments, modeling computing device 102 may be associated with an insurance provider or be in communication with the insurance provider's computer network (not shown). In other embodiments, modeling computing device 102 may be associated with a separate entity and may merely be in communication with modeling computing device 102.

Exemplary Process for Determining Acquisition Cost

Figure 2:
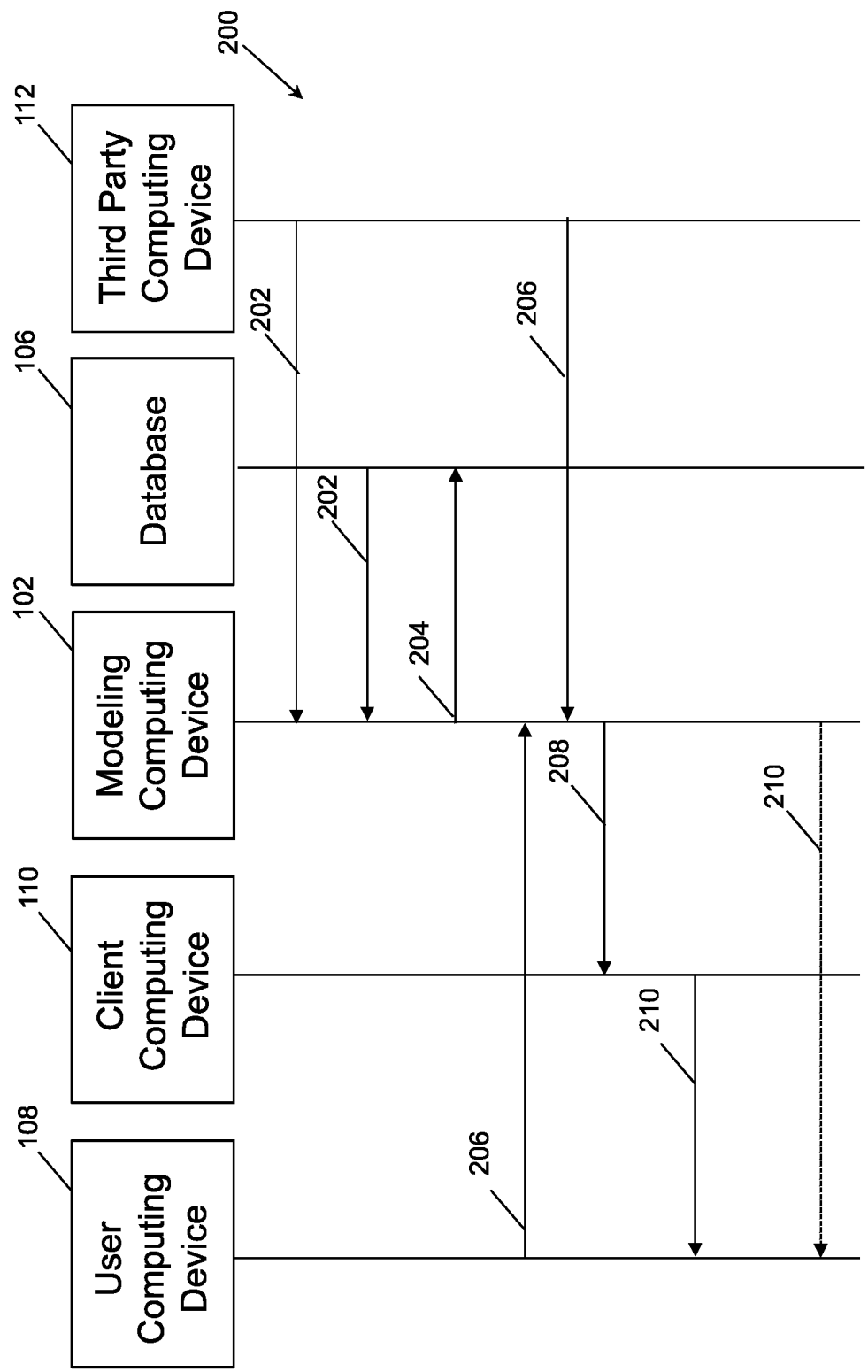
FIG. 2 illustrates a flow chart of an exemplary process that may be carried out by the computer system illustrated in FIG. 1B.

FIG. 2 illustrates a flow chart of an exemplary process 200 for generating a model to analyze user data (e.g., associated with user computing devices 108, shown in FIGS. 1A and 1B) and determine insurance policies and associated premiums for a user based upon the analyzed user data. Process 200 may be carried out by computer system 100 (shown in FIGS. 1A and 1B).

In the exemplary embodiment, modeling computing device 102 may receive historical user data 202 from at least one of database 106 and third-party computing device 112. Historical user data 202 may include, for example, historical telematics data generated from one or more telematics sensors associated with users, historical location data associated with users, and historical transaction data between the users and third-parties (e.g., ride sharing providers, scooter and/or bike rental providers, etc.) associated with third-party computing devices 112. In some embodiments, historical data 202 may include historic public transportation data obtained from one or more public transportation agencies (e.g., buses, trolleys, trams, metro, subway, airlines, coaches, ferry, trains, and rapid rail) associated with a third-party computing device 112. The historic public transportation data may include purchasing information (e.g., tickets or pass sales). Additionally, or alternatively, public transportation data may include location data related to boarding and/or departure locations, stop locations, arrival locations, and/or transit routes. Additionally, the transportation data may also include transit travel times. In some embodiments, transportation data may include traffic data (e.g., accident reports or road and driving conditions). Modeling computing device 102 may generate a model 204 that determines an insurance policy and associated premium for users based upon current user data 206 input into the model.

Modeling computing device 102 may determine a transportation mode risk score for each mode of transportation, based on, at least in part, data obtained from the one or more historic trip reports. For example, modeling computing device may use one or more historical trip reports for a metro system to determine a metro system risk score. Modeling computing device may use one or more historic trip reports for a bus transit system to determine a bus transit system risk score. In some cases, modeling computing device may determine that the metro system risk score is lower than the bus transits system risk score indicating that the metro system is a "safer" traveling option compared with the bus transit system. Modeling computing device also may determine multiple transportation mode risk scores for a single mode of transportation, based on the time of day of travel. For example, modeling computing device may use one or more historical trip reports of a metro system to determine a morning metro system risk score and an afternoon metro system risk score. In some cases, the metro system may be navigating in rush-hour traffic while the metro system operating in the afternoon is much less traveled. Accordingly, the modeling computing device may determine that the afternoon metro system risk score is lower than the morning metro system risk score indicating that the afternoon metro system is a "safer" traveling option compared with the morning metro system.

Modeling computing device 102 may determine a travel behavior risk score for a determined user travel behavior. Travel behavior risk score may be based on one or more modes of transportation risk scores, an amount of time spent traveling on the mode of transportation, time of day traveling, a distance traveled on the mode of transportation, and the like. For example, a first user and a second user may use a bus transit system to travel to and from work on a daily basis. However, the first user uses the bus transit system to travel a distance twice as long as the second user. Furthermore, the first user travels the bus transit system during peak traffic times of the day. In contrast the second user travels on the bus transit system in the late evening, during minimal traffic conditions, for a night shift. Accordingly, modeling computing device 102 may determine the travel behavior risk score of the first user is greater than the travel behavior risk score of the second user, indicating that the second user's travel behavior is "safer" than the first user's travel behavior.

Modeling computing device may determine a user routine travel risk score for a specific travel routing performed by a user. A travel routine may include a trip frequently performed by a user, for example a user may routinely travel using a bike to a bus station. The user routine travel risk score may be based on at least in part, a bike risk score and a bus risk score, the amount of time traveling using each mode of transportation, and/or distance traveled using each mode of transportation and/or time of day traveling using each mode of transportation.

Modeling computing device 102 may generate model 204 based on, at least in part, historical user data 202. Modeling computing device 102 may be used to determine an insurance policy and associated premium for user based upon current user data 206 and one or more transportation mode risk scores and travel behavior risk scores associated with one or more modes of transportation utilized by users.

Current user data 206 may be received from user computing device 108 and/or third-party computing device 112. Current user data 206, like historical user data 202, may include, for example, historical telematics data generated from one or more telematics sensors associated with users, historical location data associated with users, and historical transaction data between the users and third-parties associated with third-party computing devices 112. The model of modeling computing device 102 may analyze current user data 206 and, based upon the analysis, output an insurance plan 208 (e.g., an insurance policy and associated premium) customized for the candidate user. Insurance plan 208 may be transmitted to client computing device 110 associated with an insurance provider offering insurance plan 208 to the candidate user.

A notification 210 may be transmitted to user computing device 108 of the candidate user by modeling computing device 102 and/or client computing device 110. Notification 210 may include terms and conditions, registration rules, and other information associated with insurance plan 208. In some embodiments, notification 210 may include a pre-populated form that allows the candidate to register for the insurance policy using "one-click."

Exemplary Client Device

Figure 3:
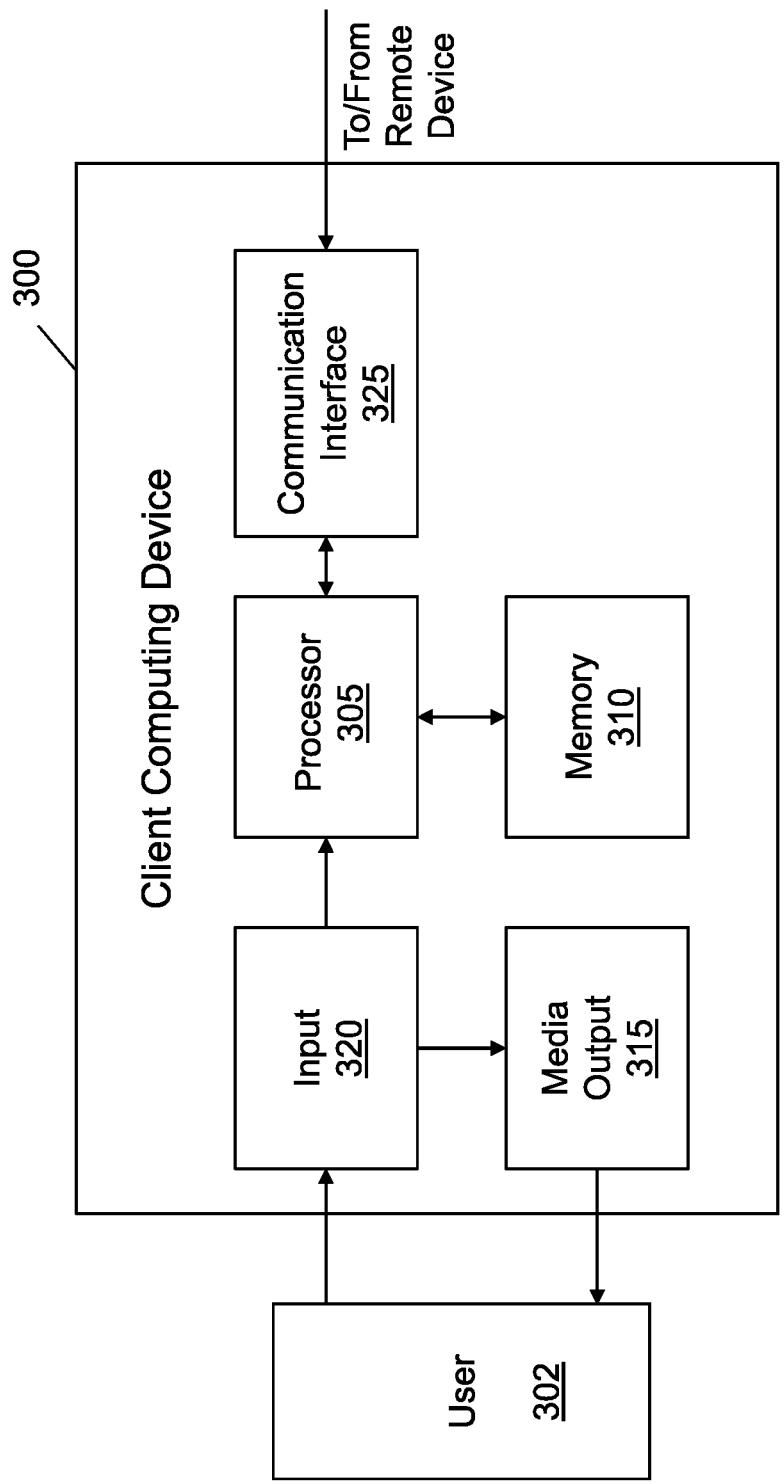
FIG. 3 illustrates an exemplary client computing device that may be used with the exemplary computer system illustrated in FIG. 1B.

FIG. 3 depicts an exemplary configuration of a client computing device 300, such as user computing device 108, client computing device 110, and third-party computing device 112, as shown in FIG. 1B, and in accordance with one embodiment of the present disclosure. Client computing device 300 may be operated by a user 302. Client computing device 300 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or transaction data to be stored and retrieved. Memory area 310 may include one or more computer readable media.

Client computing device 300 may also include at least one media output component 315 for presenting information to user 302. Media output component 315 may be any component capable of conveying information to user 302. In some embodiments, media output component 315 may include an output adapter (not shown) such as a video adapter and/or an audio adapter. An output adapter may be operatively coupled to processor 305 and adapted to operatively couple to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 may be configured to present a graphical user interface (e.g., a web browser and/or a client application) to user 302. A graphical user interface may include, for example, an online store interface for viewing and/or purchasing items, and/or a wallet application for managing payment information. In some embodiments, client computing device 300 may include an input device 320 for receiving input from user 302. User 302 may use input device 320 to, without limitation, select and/or enter data, such as, for example, user data, an insurance registration form, insurance registration data, etc.

Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

Client computing device 300 may also include a communication interface 325, communicatively coupled via a network to modeling computing device 102 (shown in FIGS. 1A and 1B). Communication interface 325 may include, for example, a wired or wireless network adapter and/or a wireless data transceiver for use with a mobile telecommunications network.

Stored in memory area 310 are, for example, computer readable instructions for providing a user interface to user 302 via media output component 315 and, optionally, receiving and processing input from input device 320. A user interface may include, among other possibilities, a web browser and/or a client application. Web browsers enable users, such as user 302, to display and interact with media and other information typically embedded on a web page or a website.

Exemplary Server System

Figure 4:
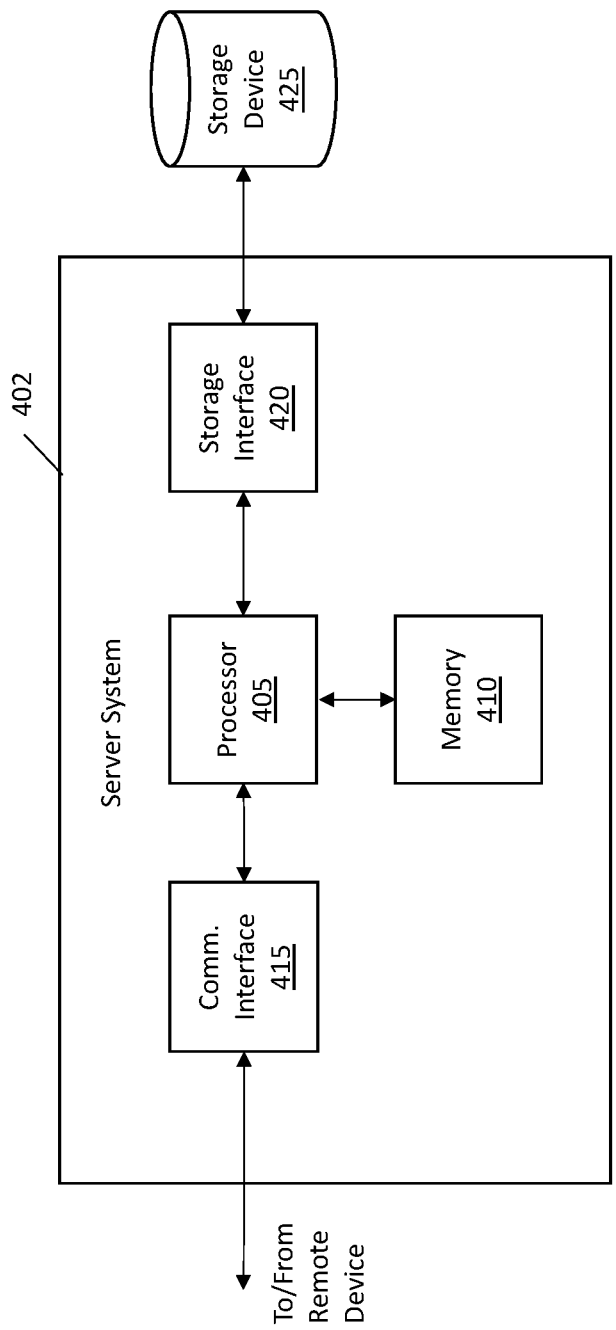
FIG. 4 illustrates an exemplary configuration of a server that may be used in the exemplary computer system illustrated in FIG. 1B.

FIG. 4 depicts an exemplary server system 400 such as modeling computing device 102, as shown in FIG. 1B, and in accordance with one exemplary embodiment of the present disclosure. Accordingly, server system 400 may include a processor 405 for executing instructions. Instructions may be stored in a memory area 410. Processor 405 may include one or more processing units (e.g., in a multi-core configuration).

Processor 405 may be operatively coupled to a communication interface 415 such that server system 400 is capable of communicating with a remote computing device. For example, communication interface 415 may receive requests from user computing devices 108, client computing device 110, and/or third-party computing devices 112 via the Internet and/or over a computer network.

Processor 405 may also be operatively coupled to a storage device 425 (e.g., database 106, shown in FIGS. 1A and 1B). Storage device 425 may be any computer-operated hardware suitable for storing and/or retrieving data. In some embodiments, storage device 425 may be integrated in server system 400. For example, server system 400 may include one or more hard disk drives as storage device 425. In other embodiments, storage device 425 may be external to server system 400 and may be accessed by a plurality of server systems 400. For example, storage device 425 may include a storage area network (SAN), a network attached storage (NAS) system, and/or multiple storage units such as hard disks and/or solid state disks in a redundant array of inexpensive disks (RAID) configuration.

In some embodiments, processor 405 may be operatively coupled to storage device 425 via a storage interface 420. Storage interface 420 may be any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Exemplary Underwriting Chart

FIGS. 5A and 5B illustrate example underwriting charts 500 and 550 including different types of coverage and the premium and liability limits for each different type of coverage. Charts 500 and 550 may be for personal mobility insurance policies customized for users who do not own a personal vehicle and use different types of transportation (e.g., public transportation, ride sharing services, bike/scooter rental services, etc.). Charts 500 and 550 may be generated (e.g., by modeling computing device 102, shown in FIGS. 1A and 1B) based upon user data for one or more users. For example, charts 500 and 550, and more specifically, premiums included within charts 500 and 550 may be generated specifically for a user based upon the user data of the user and/or charts 500 and 550 and premiums included within charts 500 and 550 may be generated for a cluster of users based upon the modes of transportation the users of the cluster most commonly use and/or the location of the users in the cluster.

Chart 500 includes options 502 and 504 for insurance coverage for a personal mobility policy and premiums 506 and 508 associated with the options 502 and 504. The options may include a first option 502 of covering physical damage (Y) or not covering physical damage (N) and a second option 504 of different medical payments coverage (MPC) limits including $5,000 and $3,000. Premiums 506 may be generated for Bodily Injury and Property Damage (BIPD) limits for a 25/50/15 policy, and premiums 508 may be generated for BIPD limits for a 100/300/100 policy. A 25/50/15 policy may refer to a policy where an insurance provider will cover up to $25,000 of bodily injury per person involved in an incident, $50,000 of maximum bodily injury per accident, and $15,000 of property damage per accident. A 100/300/100 policy may refer to a policy where an insurance provider will cover up to $100,000 of bodily injury per person involved in an incident, $300,000 of maximum bodily injury per accident, and $100,000 of property damage per accident.

Chart 550 shows another example chart generated by modeling computing device 102 for policy options and pricing for a personal mobility policy for a candidate user. A first option 552 of liability coverage and associated limits 554, a second option 564 of medical payment coverage and associated limits 566, and a third option 570 of physical damage coverage are included in chart 550. BIPD premiums 556, UBI premiums 558, WBI premiums 560, and a total premium cost 562 may be calculated for associated limits 554 (e.g., 20/50/15 and 100/300/100) of first option 552 of liability coverage. Medical payment premiums 568 are calculated for associated limits 566 (e.g., $3,000 and $5,000) of second option 564 of medical payment coverage. Physical damage premium 572 is calculated for third option 570 of physical damage coverage.

Users may input what type of insurance coverage the users wish to receive and/or modeling computing device 102 may determine what type of insurance coverage each user should receive based upon the user data of the users. For example, with reference to FIG. 5A, modeling computing device 102 and/or client computing device 110 (shown in FIGS. 1A and 1B) may transmit the different types of insurance options 502 and 504 to user via user computing device 108 (shown in FIGS. 1A and 1B). That is, modeling computing device 102 and/or client computing device 110 may transmit a prompt (e.g., a text message, a push notification, an email, etc.) to a user prompting them to input whether the user wants physical damage coverage 502, MPC limits 504 the user wants, and whether the user wants 25/50/15 BIPD limits coverage, or 100/300/100 BIPD limits coverage.

In other embodiments, modeling computing device 102 may automatically determine, using machine learning and/or artificial intelligence techniques, coverage for the user based upon the user data. For example, if modeling computing device 102 analyzes the user data and determines that the user typically uses walking and a bicycle for modes of transportation, modeling computing device 102 may determine that coverage for the user should include physical damage, that the MPC limits for the coverage of the user should be $3,000, and that the BIPD limits for the coverage of the user should be 25/50/15. Modeling computing device 102 and/or client computing device 110 may transmit the automatically determined coverage and generated premium to the user, and the user may register for coverage with a "one-click" registration button included within the notification from modeling computing device 102 and/or client computing device 110.

Exemplary Computer-Implemented Method

Figure 6:
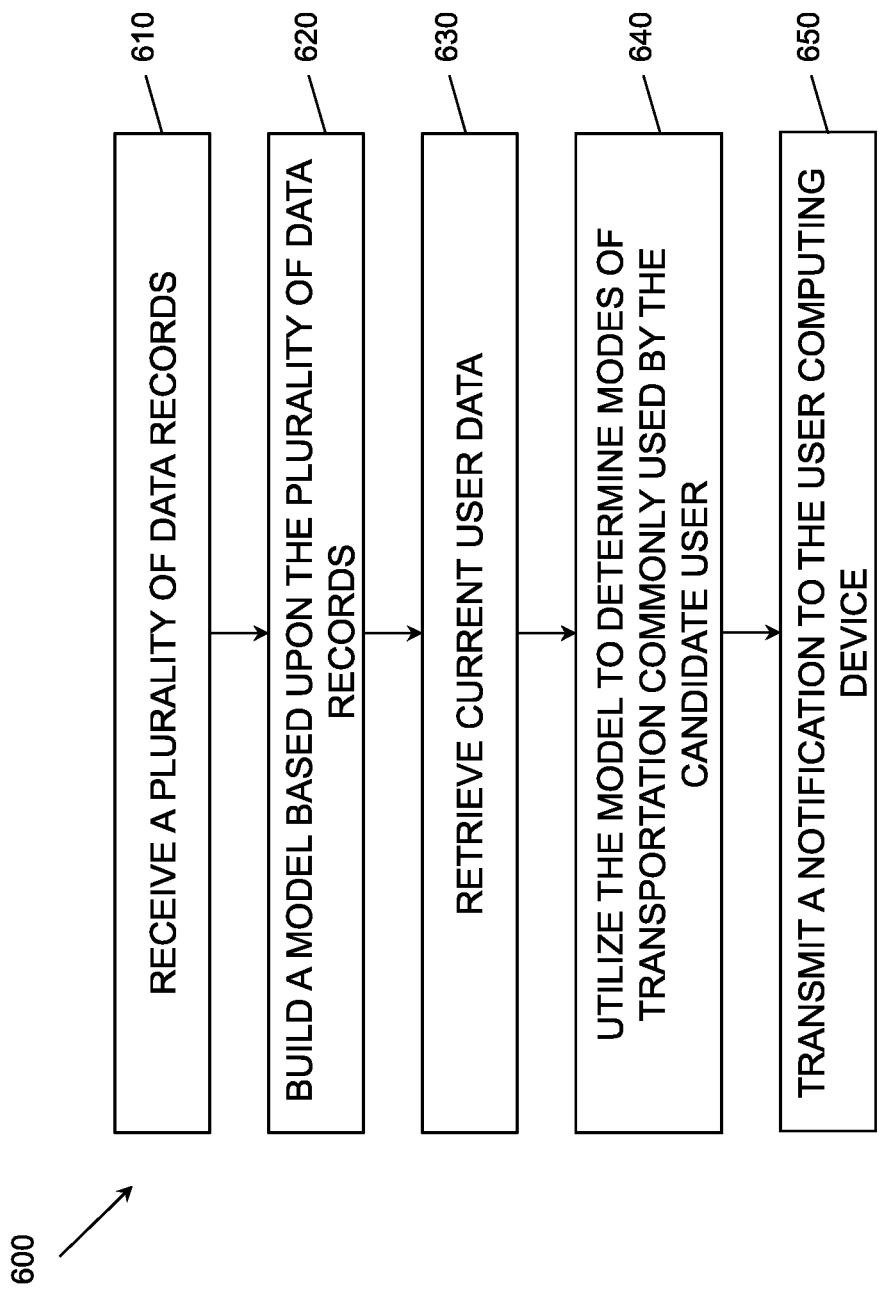
FIG. 6 illustrates a flow chart of an exemplary computer-implemented process for determining modes of transportation by generating and training a model using the computer system shown in FIG. 1B.

FIG. 6 illustrates a flow chart of an exemplary computer-implemented process 600 for generating a model to analyze user data and determine insurance policies and associated premiums for users based upon the user data. Process 600 may be implemented, at least in part, by a computing device/server, for example, modeling computing device 102 (shown in FIGS. 1A and 1B).

Process 600 may include receiving 610 (e.g., by modeling computing device 102), from at least one memory (e.g., of and/or in communication with modeling computing device 102), a plurality of data records associated with a plurality of users. The plurality of data records may include historical user data. Process 600 may further include building 620 (e.g., by modeling computing device 102) a model based upon the plurality of data records. The model may be trained to predict modes of transportation commonly used by the plurality of users and insurance policies and associated premiums of the plurality of users based upon the historical user data.

Process 600 may further include retrieving 630 (e.g., by modeling computing device 102), from a user computing device (e.g., user computing device 108, shown in FIGS. 1A and 1B) of a candidate user, current user data associated with the candidate user. The model may be utilized 640 (e.g., by modeling computing device 102) to determine modes of transportation commonly used by the candidate user and an insurance policy and an associated premium for the candidate user based upon the retrieved current user data.

Additionally, process 600 may include transmitting 650 (e.g., by modeling computing device 102) a notification to the user computing device (e.g., user computing device 108). The notification may include a prompt for the user to register for the determined (e.g., by modeling computing device 102 using the model) insurance policy.

Exemplary Computer-Implemented Method

Figure 7:
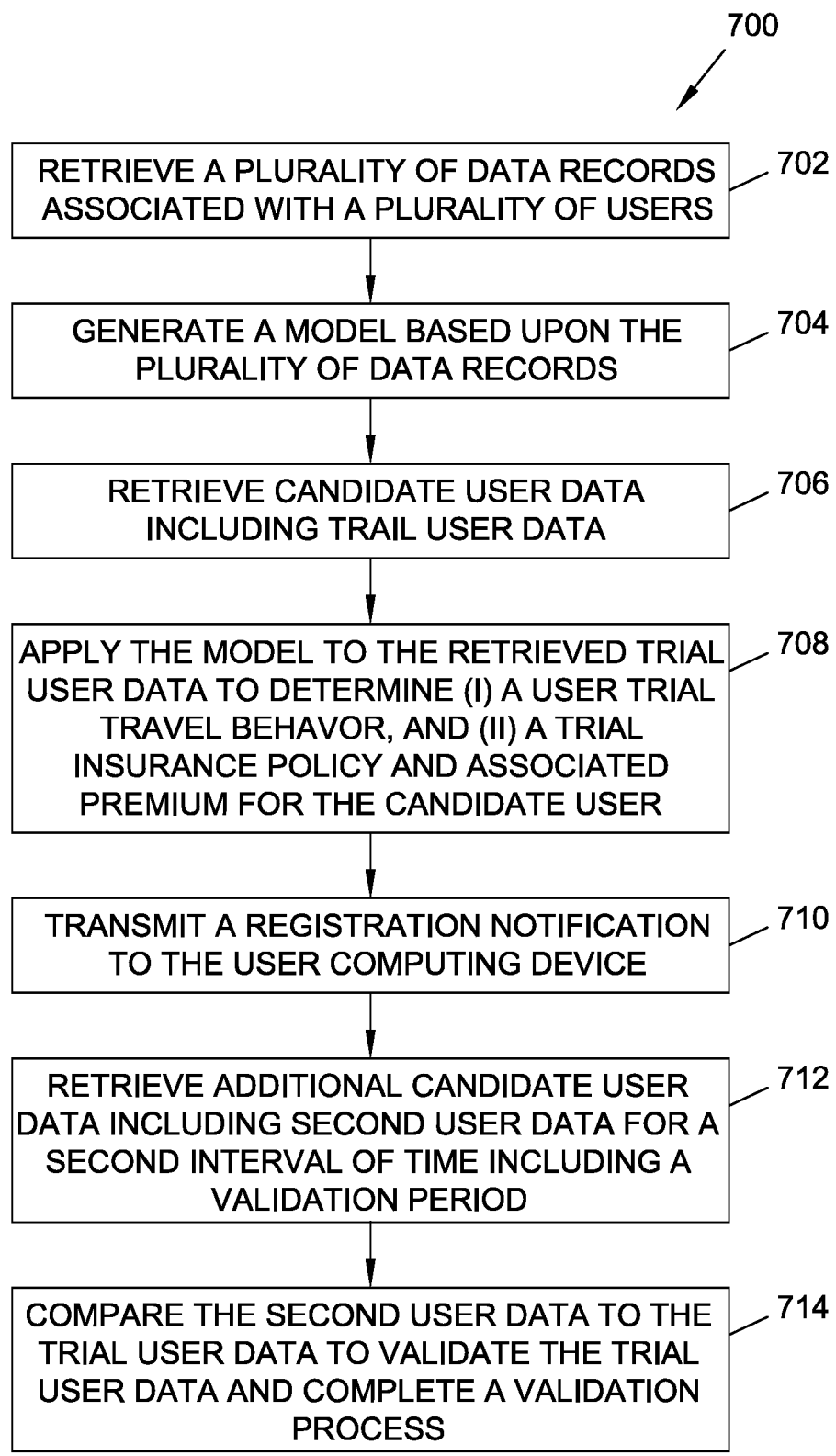
FIG. 7 illustrates a flow chart of an exemplary computer-implemented process for determining travel behavior of a user by generating and training a model using the exemplary computer system shown in FIG. 1B.

FIG. 7 illustrates a flow chart of an exemplary computer-implemented process 700 for generating a model to analyze user data and determine travel behavior and determine insurance policies and associated premiums for users based upon the user data. Process 700 may be implemented, at least in part, by a computing device/server, for example, modeling computing device 102 (shown in FIGS. 1A and 1B).

Process 700 may include retrieving 702 (e.g., by modeling computing device 102), from at least one memory (e.g., of and/or in communication with modeling computing device 102), a plurality of data records associated with a plurality of users. The plurality of data records may include historical user data. In addition to historical user data from the plurality of users, the plurality of data records may also include contextual data. The contextual data may include, but is not limited to, street maps, public transportation schedules, rules of travel for various forms of travel, and any other information to allow the system to determine how different users may have traveled. Process 700 may further include generating 704 (e.g., by modeling computing device 102) a model based upon the plurality of data records. The model may be trained to (i) predict travel behavior of a user including each different mode of transportation used by the user, and (ii) output an insurance policy and associated premium for the user based upon the predicted travel behavior.

During a trial period, process 700 may further include retrieving 706 candidate user data (e.g., by modeling computing device 102), from a user computing device (e.g., user computing device 108, shown in FIGS. 1A and 1B) of a candidate user. The candidate user data includes trial user data for a first interval of time comprising the trial period. In one embodiment, the candidate user data may only include a minimal amount of data, for example, the age and home geographic location of the user, such that the model is able to make the predictions described herein using only this minimal amount of data, and thus, save a significant amount of time which is typically used to gather other information from the user for underwriting purposes.

Process 700 may further include applying 708 (e.g., by modeling computing device 102) the model to the to the retrieved trial user data to determine (i) a user trial travel behavior, and (ii) a trial insurance policy and associated premium for the candidate user. In step 708, the modeling computing device 102 may execute the model and use the retrieved trial user data as inputs into the model to receive outputs of (i) the user trial travel behavior, and (ii) the trial insurance policy and associated premium for the candidate user.

Additionally, process 700 may include transmitting 710 (e.g., by modeling computing device 102) a registration notification to the user computing device (e.g., user computing device 108). The registration notification includes a prompt for the candidate user to select. The selection of the prompt causes the user to be registered for the determined trial insurance policy (e.g., by modeling computing device 102 using the model). For example, the prompt may include a single button (e.g., virtual button) displayed on the user computing device such that the user can select the button by clicking or tapping and by so doing, the user accepts the determined insurance policy and is enrolled in the policy.

In some embodiments, during a validation period, process 700 may further include retrieving 712 (e.g., by modeling computing device 102), from a user computing device (e.g., user computing device 108, shown in FIGS. 1A and 1B) of a candidate user, additional candidate user data including second user data for a second interval of time including a validation period. The process 700 may further include comparing (e.g., by modeling computing device 102) the second user data to the trial user data to validate the trial user data and complete a validation process. The modeling computing device 102 may execute the model and use the second user data as inputs into the model to receive output of validation of the user trial travel behavior. When the second user data matches the trial user data within a predetermined threshold amount, the trial travel behavior is validated, and the trial insurance policy is renewed.

In some embodiments, process 700 includes applying (e.g., by modeling computing device 102) the model to determine (i) a user validation travel behavior and (ii) a validation insurance policy and associated premium for the candidate user. Process 700 may include comparing (e.g., by modeling computing device 102) the user validation travel behavior to the user trial travel behavior to validate the trial travel behavior and complete a validation process. The modeling computing device 102 may execute the model and use the user trial travel behavior as inputs into the model to receive an output of (i) the user validation travel behavior and (ii) the validation insurance policy and associated premium for the candidate user. When the user validation travel behavior matches the user trial travel behavior within a predetermined threshold amount, the trial travel behavior is validated, and the trial insurance policy is renewed.

In some embodiments, process 700 includes comparing the validation insurance policy to the insurance policy and associated premium for the user based upon the predicted travel behavior to validate the trial user data and complete a validation process. When the validation insurance policy matches the insurance policy and associated premium for the user based upon the predicted travel behavior within a predetermined threshold amount, the trial travel behavior is validated, and the trial insurance policy is renewed.

When the validation process is successful, process 700 may include transmitting (e.g., by modeling computing device 102) transmitting a validation message to the user computing device (e.g., user computing device 108, shown in FIGS. 1A and 1B). The validation message may include a prompt for the user to confirm registration of the trial insurance policy.

Exemplary Embodiments & Functionality

In one aspect, a computing system including a processor in communication with at least one memory may be provided. The processor may be configured to: (1) receive, from the at least one memory, a plurality of data records associated with a plurality of users, wherein the plurality of data records includes historical user data; (2) build a model based upon the plurality of data records, wherein the model predicts (i) modes of transportation commonly used by the plurality of users, and/or (ii) insurance policies and associated premiums of the plurality of users based upon the historical user data; (3) retrieve, from a user computing device of a candidate user, current user data associated with the candidate user; (4) utilize the model to determine (a) the modes of transportation commonly used by the candidate user, and/or (b) an insurance policy and an associated premium for the candidate user based upon the retrieved current user data; and/or (5) transmit a notification to the user computing device, wherein the notification includes a prompt for the user to register for the determined insurance policy. The computer system may include additional, less, or alternate functionality, including that discussed elsewhere herein.

For example, the user data may include at least one of (i) personal data including demographics data, (ii) sensor data retrieved from one or more sensors of a user computing device of the user, the sensor data including telematics data and the modes of transportation the user utilizes frequently, and (iii) third-party data retrieved from computing devices associated with one or more third parties, the third-party data including a transaction history of transactions carried out at the third parties by the user, the transaction history including ride sharing transactions, public transportation data, bike rentals, and e-scooter rentals. The model may be trained to divide the plurality of users into clusters based upon the locations of the plurality of users, and the processor may be further configured to (i) determine, utilizing the model, the most frequent modes of transportation for each cluster of users, (ii) determine the cluster associated with the candidate user based upon the current sensor data, (iii) adjust at least one of the determined insurance policy and associated premium based upon the cluster of the candidate user, (iv) determine a risk associated with the most frequent modes of transportation for each cluster of users, and/or (v) adjust at least one of the determined insurance policy and associated premium based upon the risk associated with the cluster of the candidate user.

The processor may be further configured to: (i) analyze the current user data of the candidate user, (ii) generate at least one of preferred modes of transportation and preferred routes for the candidate user, (iii) transmit a notification to the user computing device of the candidate user including the at least one of the preferred modes of transportation and preferred routes for the candidate user, (iv) analyze the current sensor data to determine that the candidate user is utilizing at least one of the preferred modes of transportation and preferred routes, and/or (v) transmit a reward to the candidate user, wherein the reward includes at least one of a reimbursement of a portion of the premium of the candidate user and a credit toward a subsequent premium of the candidate user.

The processor may also be configured to: (i) automatically populate, using the candidate user data, a form for registering for the determined insurance policy, (ii) provide the populated form in the notification to the candidate user, wherein the form includes a one-click option for the user to verify the populated form and approve registering for the insurance policy and associated premium, and/or (iii) utilize at least one of machine learning and artificial intelligence techniques to generate the model. The insurance policy may include a personal mobility insurance policy, and the personal mobility insurance policy may include coverage of one or more modes of transportation including walking, public transportation, ride sharing services, driving a rental vehicle, riding a bike, and riding an electric scooter.

In another embodiment, a computer-implemented method implemented by a computing system including a processor in communication with at least one memory may be provided. The method may include: (1) receiving, from the at least one memory, a plurality of data records associated with a plurality of users, wherein the plurality of data records includes historical user data; (2) building a model based upon the plurality of data records, wherein the model predicts (i) modes of transportation commonly used by the plurality of users, and/or (ii) insurance policies and associated premiums of the plurality of users based upon the historical user data; (3) retrieving, from a user computing device of a candidate user, current user data associated with the candidate user; (4) utilizing the model to determine (a) the modes of transportation commonly used by the candidate user, and/or (b) an insurance policy and an associated premium for the candidate user based upon the retrieved current user data; and/or (5) transmitting a notification to the user computing device, wherein the notification includes a prompt for the user to register for the determined insurance policy. The method may include additional, less, or alternate actions, including those discussed elsewhere herein. In yet another embodiment, at least one non-transitory computer-readable storage media having computer-executable instructions embodied thereon may be provided. When executed by at least one processor in communication with at least one memory device, the computer-executable instructions may cause the processor to: (i) receive, from the at least one memory, a plurality of data records associated with a plurality of users, wherein the plurality of data records includes historical user data, (ii) build a model based upon the plurality of data records, wherein the model predicts (1) modes of transportation commonly used by the plurality of users, and/or (2) insurance policies and associated premiums of the plurality of users based upon the historical user data, (iii) retrieve, from a user computing device of a candidate user, current user data associated with the candidate user, (iv) utilize the model to determine (a) the modes of transportation commonly used by the candidate user, and/or (b) an insurance policy and an associated premium for the candidate user based upon the retrieved current user data, and/or (v) transmit a notification to the user computing device, wherein the notification includes a prompt for the user to register for the determined insurance policy. The instructions may direct additional, less, or alternate functionality, including that discussed elsewhere herein.

In another aspect, a computing system including a processor in communication with at least one memory may be provided. The processor may be configured to: (1) retrieve, from the at least one memory, a plurality of data records associated with a plurality of users, wherein the plurality of data records includes historical user data, (2) generate a model based upon the plurality of data records, wherein the model is configured to (i) predict travel behavior of a user, and (ii) output an insurance policy and associated premium for the user based upon the predicted travel behavior, (3) retrieve, from a user computing device of a candidate user, candidate user data including trial user data for a first interval of time comprising a trial period, (4) apply the model to the retrieved trial user data to determine (i) a user trial travel behavior, and (ii) a trial insurance policy and associated premium for the candidate user, and/or (5) transmit a registration notification to the user computing device, wherein the registration notification includes a prompt for the candidate user to select, the selection of the prompt causes the user to be registered for the determined trial insurance policy. The computer system may include additional, less, or alternate functionality, including that discussed elsewhere herein.

In another embodiment, a computer-implemented method implemented by a computing system including a processor in communication with at least one memory may be provided. The method may include: (1) retrieving, from the at least one memory, a plurality of data records associated with a plurality of users, wherein the plurality of data records includes historical user data, (2) generating a model based upon the plurality of data records, wherein the model is configured to (i) predict travel behavior of a user, and (ii) output an insurance policy and associated premium for the user based upon the predicted travel behavior, (3) retrieving, from a user computing device of a candidate user, candidate user data including trial user data for a first interval of time comprising a trial period, (4) applying the model to the retrieved trial user data to determine (i) a user trial travel behavior, and (ii) a trial insurance policy and associated premium for the candidate user, and/or (5) transmitting a registration notification to the user computing device, wherein the registration notification includes a prompt for the candidate user to select, the selection of the prompt causes the user to be registered for the determined trial insurance policy. The method may include additional, less, or alternate actions, including those discussed elsewhere herein.

In yet another embodiment, at least one non-transitory computer-readable storage media having computer-executable instructions embodied thereon may be provided. When executed by at least one processor in communication with at least one memory device, the computer-executable instructions may cause the processor to: (1) retrieve, from the at least one memory, a plurality of data records associated with a plurality of users, wherein the plurality of data records includes historical user data, (2) generate a model based upon the plurality of data records, wherein the model is configured to (i) predict travel behavior of a user, and (ii) output an insurance policy and associated premium for the user based upon the predicted travel behavior, (3) retrieve, from a user computing device of a candidate user, candidate user data including trial user data for a first interval of time comprising a trial period, (4) apply the model to the retrieved trial user data to determine (i) a user trial travel behavior, and (ii) a trial insurance policy and associated premium for the candidate user, and/or (5) transmit a registration notification to the user computing device, wherein the registration notification includes a prompt for the candidate user to select, the selection of the prompt causes the user to be registered for the determined trial insurance policy. The instructions may direct additional, less, or alternate functionality, including that discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models (e.g., maintenance, charging, and/or pricing models, which may be part of a single model or be separate models) may be created based upon example inputs in order to make valid and reliable predictions for novel inputs.

Additionally or alternatively, the machine learning programs may be trained by inputting sample data sets or certain data into the programs, such as vehicle telematics data, and/or industry accident and repair/medical data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, CA; IBM is a registered trademark of International Business Machines Corporation, Armonk, New York; Microsoft is a registered trademark of Microsoft Corporation, Redmond, WA; and Sybase is a registered trademark of Sybase, Dublin, California).

In some embodiments, the system includes multiple components distributed among a plurality of computing devices. In one embodiment, the system includes a plurality of virtual computing devices (e.g., virtual machines) in a cloud configuration, such that the virtual computing devices may be dynamically allocated. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computing system comprising a processor in communication with at least one memory, the processor configured to:
retrieve, from the at least one memory, a plurality of data records associated with a plurality of different historical users, wherein each of the plurality of data records includes historical user data including (i) demographic data associated with each different historical user of the plurality of different historical users, (ii) travel data including historical travel habits, historical telematics data, historical modes of transportation associated with the historical telematics data, and historical accident data associated with one or more modes of transportation;
determine a historical travel risk score for each of the plurality of historical users based on the travel data of each respective historical user indicating a likelihood of loss associated with the travel;
create a learning dataset including the plurality of data records and the historical travel risk scores associated with the plurality of different historical users;
using machine learning and/or artificial intelligence techniques, train a model using the learning dataset, wherein the trained model is configured to predict a travel behavioral profile of a new candidate user by inputting new candidate travel data including new telematics data of the new candidate user into the trained model, wherein the new candidate user is different from the plurality of historical users of the learning dataset, and wherein the predicted travel behavioral profile includes one or more predicted travel features including predicted modes of transportation, one or more predicted travel routes, one or more predicted accidents, and a risk score associated with the travel behavioral profile;
retrieve, from a user computing device of a first new candidate user, trial travel data for the first new candidate user for a first interval of time comprising a trial period;
output the predicted travel behavioral profile for the first new candidate user for the trial period by inputting the trial travel data for the first new candidate user into the trained model;
retrieve, from the user computing device of the first new candidate user, validation travel data for a second interval of time comprising a validation period, the validation travel data forming an actual travel behavioral profile for the first new candidate user for the validation period;
compare the predicted travel behavioral profile to the actual travel behavioral profile for the first new candidate user to determine model updates for the first new candidate user;
using machine learning and/or artificial intelligence techniques, retrain the model using the determined model updates for the first new candidate user;
input the trial travel data and the validation travel data into the retrained model to output an updated user travel behavioral profile for the first new candidate user; and
transmit a notification to the user computing device for display on the user computing device, wherein the notification includes one or more predicted features of the user updated travel behavioral profile and a prompt for the first new candidate user to confirm one or more of the predicted travel features of the user updated travel behavioral profile.

2. The computing system of claim 1, wherein the processor is further configured to compare the validation travel data to the trial travel data to validate the trial travel data and complete a validation process, wherein when the validation travel data matches the trial travel data within a predetermined threshold amount, the user travel behavioral profile is validated.

3. The computing system of claim 2, wherein the processor is further configured to when the validation process is successful, transmit a validation message to the user computing device.

4. The computing system of claim 2, wherein the processor is further configured to:
when the validation process is unsuccessful, retrain the model using the validation travel data collected during the validation period;
apply the retrained model to the retrieved candidate user data to determine an updated user travel behavioral profile; and
transmit a notification to the user computing device.

5. The computing system of claim 1, wherein the travel behavioral profile includes at least one of: age range of the user, residence of the user, user occupational information, a user routine travel, a user periodic travel, distance traveled using the one or more modes of transportation, an amount of time traveled using the one or more modes of transportation, a time of day of travel, and frequency of travel, and wherein the trial travel data is collected using an app executed by a candidate user mobile computing device and one or more sensors integrated within the candidate user mobile computing device, wherein the one or more sensors include a location sensor, an accelerometer, and a gyroscope for collecting telematic data, wherein the candidate user mobile computing device is configure to automatically transmit the telematic data to the processor for further analysis.

6. The computing system of claim 1, wherein the candidate user data and the data records associated with the plurality of users includes at least one of (i) personal data including demographics data, (ii) sensor data retrieved from one or more sensors of a user computing device of the user, the sensor data including the telematics data, and (iii) third-party data retrieved from computing devices associated with one or more third parties, the third-party data including a transaction history of transactions carried out at the third parties by the user, the transaction history including ride sharing transactions, bike rentals, public transportation data, and e-scooter rentals.

7. The computing system of claim 6, wherein the processor is further configured to:
apply the model to the candidate user data to predict a preferred travel routine for the candidate user; and
transmit a notification to the user computing device of the candidate user for display on the user computing device, the notification including the preferred travel routine formatted for display to the candidate user on the user computing device based on a current location of the candidate user and a current time.

8. The computing system of claim 7, wherein the processor is further configured to:
analyze the sensor data of the candidate user data during a real-time travel event to determine when the candidate user engages in at least one of the preferred travel routine; and
transmit a reward to the candidate user.

9. The computing system of claim 7, wherein the model divides the plurality of users into clusters based upon locations of the plurality of users, and wherein the processor is further configured to apply the model to the plurality of data records associated with a plurality of users to determine a most frequent travel behavioral profile for each cluster of users.

10. The computing system of claim 9, wherein the processor is further configured to:
determine the cluster associated with the candidate user based upon the sensor data of the candidate user data.

11. The computing system of claim 10, wherein the processor is further configured to:
determine a cluster risk score associated with the travel behavioral profile for each cluster of users.

12. The computing system of claim 1, wherein the processor is further configured to:
automatically populate, using the user data, a form for registering for an insurance policy; and
provide the populated form in the notification to the candidate user, wherein the form includes a one-click option for the candidate user to verify the populated form and approve registering for the insurance policy and associated premium.

13. The computing system of claim 1, wherein the processor is further configured to:
utilize at least one of machine learning and artificial intelligence techniques to generate the model using the learning dataset.

14. The computing system of claim 12, wherein the insurance policy includes a personal mobility insurance policy, and wherein the personal mobility insurance policy includes coverage of one or more modes of transportation including walking, public transportation, ride sharing services, driving a rental vehicle, riding a bike, and riding an electric scooter.

15. A computer-implemented method implemented by a computing system including a processor in communication with at least one memory, the method comprising:
retrieving, from the at least one memory, a plurality of data records associated with a plurality of different historical users, wherein the each of the
plurality of data records includes (i) historical user data including demographic data associated with each different historical user of the plurality of different historical users, (ii) travel data including historical travel habits, historical telematics data, historical modes of transportation associated with the historical telematics data, and historical accident data associated with one or more modes of transportation;
determine a historical travel risk score for each of the plurality of historical users based on the travel data of each respective historical user indicating a likelihood of loss associated with the travel;
creating a learning dataset including the plurality of data records and the historical travel risk scores associated with the plurality of different historical users;
using machine learning and/or artificial intelligence techniques, training a model using the learning dataset, wherein the trained model is configured to predict a travel behavioral profile of a new candidate user by inputting new candidate travel data including new telematics data of the new candidate user into the trained model, wherein the new candidate user is different from the plurality of historical users of the learning dataset, and wherein the predicted travel behavioral profile includes one or more predicted travel features including predicted modes of transportation, one or more predicted travel routes, one or more predicted accidents, and a risk score associated with the travel behavioral profile;
retrieving, from a user computing device of a first new candidate user, trial travel data for the first new candidate user for a first interval of time comprising a trial period;
output the predicted travel behavioral profile for the first new candidate user for the trial period by inputting the trial travel data for the first new candidate user into the trained model;
retrieve, from the user computing device of the first new candidate user, validation travel data for a second interval of time comprising a validation period, the validation travel data forming an actual travel behavioral profile for the first new candidate user for the validation period;
compare the predicted travel behavioral profile to the actual travel behavioral profile for the first new candidate user to determine model updates for the first new candidate user;
using machine learning and/or artificial intelligence techniques, retrain the model using the determined model updates for the first new candidate user;
inputting the trial travel data and the validation travel data into the retrained model to output an updated user travel behavioral profile for the first new candidate user including one or more predicted travel routes, one or more predicted modes of transportation for the first new candidate user, one or more predicted accidents, and a user risk score associated with the updated travel behavioral profile; and
transmitting a notification to the user computing device for display on the user computing device, wherein the notification includes one or more predicted features of the user updated travel behavioral profile and a prompt for the first new candidate user to confirm one or more of the predicted travel features of the updated travel behavioral profile.

16. At least one non-transitory computer-readable storage media having computer-executable instructions embodied thereon, wherein when executed by at least one processor in communication with at least one memory device, the computer-executable instructions cause the processor to:

retrieve, from the at least one memory, a plurality of data records associated with a plurality of different historical users, wherein each of the plurality of data records includes (i) historical user data including demographic data associated with each different historical user of the plurality of different historical users, (ii) travel data including historical travel habits, historical telematics data, historical modes of transportation associated with the historical telematics data, and historical accident data associated with one or more modes of transportation;

determine a historical travel risk score for each of the plurality of historical users based on the travel data of each respective historical user indicating a likelihood of loss associated with the travel;

creating a learning dataset including the plurality of data records and the historical travel risk scores associated with the plurality of different historical users;

using machine learning and/or artificial intelligence techniques, training a model using the learning dataset, wherein the trained model is configured to predict a travel behavioral profile of a new candidate user by inputting new candidate travel data including new telematics data of the new candidate user into the trained model, wherein the new candidate user is different from the plurality of historical users of the learning dataset, and wherein the predicted travel behavioral profile includes one or more predicted travel features including predicted modes of transportation, one or more predicted travel routes, one or more predicted accidents, and a risk score associated with the travel behavioral profile;

retrieve, from a user computing device of a first new candidate user, trial travel data for the first new candidate user for a first interval of time comprising a trial period;

output the predicted travel behavioral profile for the first new candidate user for the trial period by inputting the trial travel data for the first new candidate user into the trained model;

retrieve, from the user computing device of the first new candidate user, validation travel data for a second interval of time comprising a validation period, the validation travel data forming an actual travel behavioral profile for the first new candidate user for the validation period;

compare the predicted travel behavioral profile to the actual travel behavioral profile for the first new candidate user to determine model updates for the first new candidate user;

using machine learning and/or artificial intelligence techniques, retrain the model using the determined model updates for the first new candidate user;

input the trial travel data and the validated travel data into the retrained model to output an updated user travel behavioral profile for the first new candidate user including one or more predicted travel routes, one or more predicted modes of transportation for the first new candidate user, one or more predicted accidents, and a user risk score associated with the updated travel behavioral profile; and transmit a notification to the user computing device for display on the user computing device, wherein the notification includes one or more predicted features of the user updated travel behavioral profile and a prompt for the first new candidate user to confirm one or more of the predicted travel features of the updated travel behavioral profile.

\* \* \* \* \*